US011479364B2

(12) United States Patent
Lambton et al.

(10) Patent No.: US 11,479,364 B2
(45) Date of Patent: Oct. 25, 2022

(54) AIRCRAFT TORQUE CONTROL DEVICE

(71) Applicant: Safe Flight Instrument, LLC, White Plains, NY (US)

(72) Inventors: Michael J. Lambton, Ridgefield, CT (US); Louis C. Simons, Mamaroneck, NY (US); Randall A. Greene, White Plains, NY (US)

(73) Assignee: Safe Flight Instrument, LLC, White Plains, NY (US)

( * ) Notice: Subject to any disclaimer, the term of this patent is extended or adjusted under 35 U.S.C. 154(b) by 426 days.

(21) Appl. No.: 16/219,775

(22) Filed: Dec. 13, 2018

(65) Prior Publication Data

US 2019/0176997 A1 Jun. 13, 2019

Related U.S. Application Data

(60) Provisional application No. 62/598,352, filed on Dec. 13, 2017.

(51) Int. Cl.
*B64D 31/04* (2006.01)
*B64D 31/14* (2006.01)
*B64D 31/06* (2006.01)

(52) U.S. Cl.
CPC ............ *B64D 31/04* (2013.01); *B64D 31/06* (2013.01); *B64D 31/14* (2013.01)

(58) Field of Classification Search
CPC ......... B64D 31/04; B64D 31/06; G05D 1/085
See application file for complete search history.

(56) References Cited

U.S. PATENT DOCUMENTS 2,359,392 A * 10/1944 Shoemaker ............ B64D 31/04
74/516
3,057,585 A * 10/1962 Ziegler ............... B64C 13/0421
244/236
3,060,362 A * 10/1962 Redmond ............ G05D 1/0061
318/591

(Continued)

FOREIGN PATENT DOCUMENTS

EP    0085518 B1    8/1983
EP    0493795 B1    7/1992

(Continued)

*Primary Examiner* — Christopher D Hutchens
(74) *Attorney, Agent, or Firm* — Morrison & Foerster LLP

(57) ABSTRACT

An electronic aircraft control system and an electronic aircraft control method are provided. In some embodiments, the aircraft control system includes a motor including a rotating shaft, a lever including an axis of rotation, the lever connected to the rotating shaft, wherein the position of the lever is not maintained by a mechanical clutch during normal operations. In some embodiments, the aircraft control system includes a fail-safe system for maintaining mechanical friction of the lever in an event of a failure, a sensor identifying a position of the lever, and a transmitter transmitting the lever position to a controller, the controller adjusting an aircraft performance device based on the received lever position. In some embodiments, the motor provides a torque on the lever. In some embodiments, the fail-safe system includes shear pins configured to break when a sufficient amount of manual torque is applied to the lever.

38 Claims, 8 Drawing Sheets

(56) References Cited

U.S. PATENT DOCUMENTS

| | | | | |
|---|---|---|---|---|
| 3,119,580 | A | * | 1/1964 | Murphy .................. B64C 13/24 244/236 |
| 3,289,490 | A | | 12/1966 | Redmond |
| 3,363,480 | A | * | 1/1968 | Murphy ................. G05G 11/00 475/4 |
| 3,378,217 | A | * | 4/1968 | Diani ...................... B64C 13/00 244/178 |
| 3,523,665 | A | | 8/1970 | Launor et al. |
| 3,908,513 | A | * | 9/1975 | Leoni ..................... B64C 13/42 91/384 |
| 4,567,786 | A | | 2/1986 | Sakurai et al. |
| 4,793,133 | A | * | 12/1988 | White ...................... F02C 9/46 60/39.281 |
| 4,947,070 | A | | 8/1990 | Hill et al. |
| 5,188,316 | A | * | 2/1993 | Dressler ................. B64D 31/02 192/41 R |
| 5,655,636 | A | | 8/1997 | Lang et al. |
| 5,868,359 | A | | 2/1999 | Cartmell et al. |
| 6,171,055 | B1 | | 1/2001 | Vos et al. |
| 6,739,210 | B1 | * | 5/2004 | Smith .................... B64D 31/04 74/335 |
| 6,973,915 | B1 | * | 12/2005 | Henle .................... B64D 31/04 123/399 |
| 7,313,468 | B2 | | 12/2007 | Ashbolt et al. |
| 9,452,822 | B2 | | 9/2016 | Li et al. |
| 9,904,256 | B2 | * | 2/2018 | Antraygue ............. G05B 11/42 |
| 10,093,415 | B1 | * | 10/2018 | Fortenbaugh ........... B64C 13/18 |
| 10,099,795 | B2 | * | 10/2018 | Hedrick ........... B64D 31/06 |
| 10,279,893 | B2 | * | 5/2019 | Melton .................... G01S 19/13 |
| 2003/0094539 | A1 | * | 5/2003 | Schaeffer ............ B64C 29/0033 244/17.13 |
| 2013/0334372 | A1 | * | 12/2013 | Marques ................. B64C 13/16 244/76 R |
| 2016/0144948 | A1 | * | 5/2016 | Sparks .................... B64C 13/04 74/519 |
| 2017/0008614 | A1 | * | 1/2017 | Tilly ................. B64C 13/0421 |
| 2017/0017241 | A1 | * | 1/2017 | Gillett, Jr. ............. B64C 13/345 |
| 2018/0197385 | A1 | | 7/2018 | Jayaraman et al. |
| 2019/0144128 | A1 | * | 5/2019 | Prosser ................... G01W 1/00 701/14 |

FOREIGN PATENT DOCUMENTS

| | | |
|---|---|---|
| EP | 1731421 A1 | 12/2006 |
| WO | WO-2003042767 A2 | 5/2003 |
| WO | WO-2017078809 A1 | 5/2017 |

\* cited by examiner

AIRCRAFT TORQUE CONTROL DEVICE

CROSS-REFERENCE TO RELATED APPLICATIONS

This application claims benefit of U.S. Provisional Patent Application No. 62/598,352, filed Dec. 13, 2017, which is hereby incorporated by reference in its entirety.

FIELD OF THE DISCLOSURE

This disclosure relates generally to aircraft control systems and, in particular, to systems for electronically controlling the lever position on aircraft control systems.

BACKGROUND OF THE DISCLOSURE

An aircraft includes numerous aircraft control systems. These aircraft control systems monitor the state of different aspects of the aircraft and give the aircraft's pilot and/or its crew control over how these different aspects of the aircraft behave. For example, an aircraft's throttle controls (also known as power or thrust levers) give an aircraft's pilot control over how much power is generated by the aircraft's engine(s). Similarly, a control yoke gives an aircraft's pilot control over the aircraft's roll and pitch, and rudder pedals give an aircraft's pilot control over the aircraft's yaw.

Conventional aircraft control systems are often constructed of mechanical components and rely on mechanical interfaces between each mechanical component. These mechanical components can be designed to provide a user with resistance or force feedback. This can be achieved using mechanical friction via a clutch or other resistive mechanism. Additionally, mechanical detents, hard walls, and force springs can be used.

However, these mechanical components often have inherent characteristics and mechanics that cannot be dynamically changed. For example, the resistance or feedback provided to a user is based on the material used and/or the structure of the assembly and cannot be changed dynamically. For instance, the location and resistance of a mechanical detent is fixed and cannot be changed dynamically (i.e., during operation of the aircraft). Additionally, mechanical friction caused by clutches or other resistive elements can wear over time, reducing the amount of friction that is provided and requiring more frequent and/or more costly maintenance, such as repair or replacement. Pilots and/or users of these systems may have become accustomed to the feeling and usage of these conventional aircraft control systems with their current disadvantages.

SUMMARY OF THE DISCLOSURE

This disclosure relates to aircraft control systems and, in particular, to systems for electronically controlling the lever position of aircraft control systems. There exists a need for an aircraft control system that mimics the traditional feel of conventional mechanical aircraft control systems without the disadvantages of a mechanical aircraft control system.

In some embodiments, an aircraft control system comprises: a motor comprising a rotating shaft; a lever comprising an axis of rotation, the lever connected to the rotating shaft; a sensor identifying a position of the lever; and a transmitter transmitting the lever position to a controller, the controller adjusting an aircraft performance device based on the received lever position (e.g., adjusting or otherwise causing changes to the aircraft's throttle setting). In some embodiments, the aircraft control system implements a single motor assembly. In some embodiments, an aircraft control system can comprise multiple motor assemblies (e.g., two motors, two levers, two sensors and two transmitters). Thus, in some embodiments, each motor assembly can be referred to as an aircraft control module.

In some embodiments of the aircraft control systems described herein, the motor can comprise and/or be coupled to a sensor for monitoring and detecting the position of the motor (e.g., the position of the rotor within the motor). In some embodiments, this sensor is an encoder. In some embodiments, the sensor can be a resolver, capacitive measurement, potentiometer, or any other suitable positioning sensor. In some embodiments, the motor and sensor (e.g., encoder) combination is known as a servomotor. In some embodiments, the encoder can transmit the position of the motor (e.g., via the transmitter) to the controller. For ease of description, the position of the motor sensed by the sensor can be referred to as a "local" position of the motor (e.g., the position of the rotor and/or output/rotating shaft with respect to the motor). In some embodiments, the aircraft control module can further include a global positioning gear and a global positioning sensor. In some embodiments, the global positioning sensor can be a global positioning encoder, resolver, capacitive measurement, potentiometer, or any other suitable positioning sensor. In some embodiments, the global positioning sensor (e.g., global positioning encoder) is a sensor that can detect the global position of the lever and transmit the position to the controller. In some embodiments, the global position of the lever is the position of the lever with respect to the aircraft control system and/or module and/or the absolute position of the lever with respect to an environmental axis (e.g., as compared to the "local" position sensed by the local positioning sensor, as will be explained in more detail below). In some embodiments, the global position relative to the lever and local position of the servomotor are combined to create an increased range and resolution of the overall positioning system.

In some embodiments of the aircraft control systems described herein, the lever position is not maintained by mechanical friction during normal operation. In some embodiments, the lever position is maintained by the motor.

In some embodiments of the aircraft control systems described herein, the aircraft control system further comprises a fail-safe system for maintaining mechanical friction of the lever in an event of a failure. In some embodiments of the aircraft control systems described herein, the fail-safe system comprises a current sensor and the event of a failure comprises detecting a current reading above an upper threshold or does not exceed a lower threshold. In some embodiments, the fail-safe system comprises a mechanical torque limiter (e.g., which triggers when the mechanical torque is above some level and/or prevents mechanical torque above a certain level from being applied). In some embodiments of the aircraft control systems described herein, the mechanical torque limiter comprises one or more shear pins and the event of a failure comprises a manual (e.g., mechanical) torque on the lever sufficient to break the shear pins. In some embodiments, the mechanical torque limiter is any other mechanism or device that decouples the motor from the lever when torque is above a certain threshold. In some embodiments, the decoupling is either temporary or permanent. In some embodiments, the mechanical torque limiter is a ball detent torque limiter.

In some embodiments of the aircraft control systems described herein, the lever comprises an end with a handle.

In some embodiments of the aircraft control systems described herein, the lever comprises an end connected to the rotating shaft. In some embodiments of the aircraft control systems described herein, the end connected to the rotating shaft comprises the axis of rotation. In some embodiments of the aircraft control systems described herein, the end connected to the rotating shaft is connected through a gearhead. In some embodiments, the end is connected to the rotating shaft through an output arm, which is connected to a gearhead. In some embodiments, the end is connected to the rotating shaft through an output arm, but without a gearhead.

In some embodiments of the aircraft control systems described herein, the motor provides a torque opposing (e.g., resisting) or assisting manual operation of the lever. In some embodiments of the aircraft control systems described herein, the motor provides the torque during a non-automatic control mode of the aircraft. In some embodiments of the aircraft control systems described herein, the torque is manually adjustable. In some embodiments of the aircraft control systems described herein, the system further comprises a dial on the control and movement of the dial adjusts the torque provided by the motor. In some embodiments of the aircraft control systems described herein, the system further comprises a controller configured to adjust the torque applied to the shaft to simulate physical features to mimic a conventional throttle lever.

In some embodiments of the aircraft control systems described herein, the system further comprises a processor configured to determine a difference between the sensed position of the lever and a predicted position of the lever. In some embodiments of the aircraft control systems described herein, the processor disengages an automatic control mode when the difference between the sensed position of the lever and the predicted position of the lever exceeds a threshold. In some embodiments of the aircraft control systems described herein, the threshold is a temporal threshold. In some embodiments of the aircraft control systems described herein, the threshold is a spatial threshold.

In some embodiments of the aircraft control systems described herein, the motor is configured to produce an oscillation as the aircraft approaches a performance limit (e.g., as the lever is moved to the upper-most supported range).

In some embodiments, an aircraft control method comprises: connecting a lever to a motor shaft; rotating the motor shaft; identifying a position of the lever; transmitting the lever position to a controller; and adjusting, by the controller, an aircraft performance device based on the received lever position. In some embodiments, the aircraft control method connects a single motor assembly. In some embodiments, an aircraft control method can connect multiple motor assemblies (e.g., two motors, two levers, two sensors and two transmitters). Thus, in some embodiments, each motor assembly can be referred to as an aircraft control module.

In some embodiments of the aircraft control method described herein, the method further comprising coupling the motor to an encoder and monitoring and detecting, using the encoder, the position of the motor (e.g., the position of the rotor within the motor). In some embodiments, the motor and encoder combination is known as a servomotor. In some embodiments, the method further comprises transmitting, from the encoder, the position of the motor (e.g., via the transmitter) to the controller. In some embodiments, the method further comprises connecting the motor to a global positioning gear and a global positioning encoder. In some embodiments, the method further comprises detecting and transmitting, using the global positioning encoder, the global position of the lever to the controller.

In some embodiments of the aircraft control methods described herein, the method further comprises maintaining the lever position without mechanical friction during normal operation. In some embodiments, the lever position is maintained by the motor shaft.

In some embodiments of the aircraft control methods described herein, the method further comprises maintaining the lever with mechanical friction during a failure.

In some embodiments of the aircraft control methods described herein, the method further comprises: detecting a current reading; and determining a failure when the current reading exceeds an upper threshold or does not exceed a lower threshold. In some embodiments of the aircraft control methods described herein, the method further comprises providing shearing pins configured to break when a sufficient manual torque is applied to the lever. In some embodiments of the aircraft control methods described herein, a fail-safe system comprises shear pins and the event of a failure comprises a manual torque on the lever sufficient to break the shear pins.

In some embodiments of the aircraft control methods described herein, the lever comprises an end with a handle.

In some embodiments of the aircraft control methods described herein, the lever comprises an end connected to the rotating shaft. In some embodiments of the aircraft control methods described herein, the end connected to the rotating shaft comprises the axis of rotation. In some embodiments of the aircraft control methods described herein, the end connected to the rotating shaft is connected through a gearhead. In some embodiments, the end is connected to the rotating shaft through an output arm, which is connected to a gearhead. In some embodiments, the end connected to the rotating shaft through an output arm, but without a gearhead.

In some embodiments of the aircraft control methods described herein, the method further comprises providing, by the motor, a torque opposing manual operation of the lever. In some embodiments of the aircraft control methods described herein, providing, by the motor, a torque opposing manual operation of the lever further comprises providing the torque during a non-automatic control mode of the aircraft. In some embodiments of the aircraft control methods described herein, the method further comprises detecting a manual adjustment of the torque. In some embodiments of the aircraft control methods described herein, a motor control is connected to a dial and detecting manual adjustment comprises detecting movement of the dial. In some embodiments of the aircraft control methods described herein, the method further comprises adjusting the torque to simulate physical features to mimic a conventional throttle lever.

In some embodiments of the aircraft control methods described herein, the method further comprises determining a difference between the sensed position of the lever and a predicted position of the lever. In some embodiments of the aircraft control methods described herein, the method further comprises disengaging an automatic control mode when the difference between the sensed position of the lever and the predicted position of the lever exceeds a threshold. In some embodiments of the aircraft control methods described herein, the threshold is a temporal threshold. In some embodiments of the aircraft control methods described herein, the threshold is a spatial threshold.

In some embodiments of the aircraft control systems described herein, the method further comprises producing a motor oscillation as the aircraft approaches a performance limit.

DETAILED DESCRIPTION

Figure 1A:
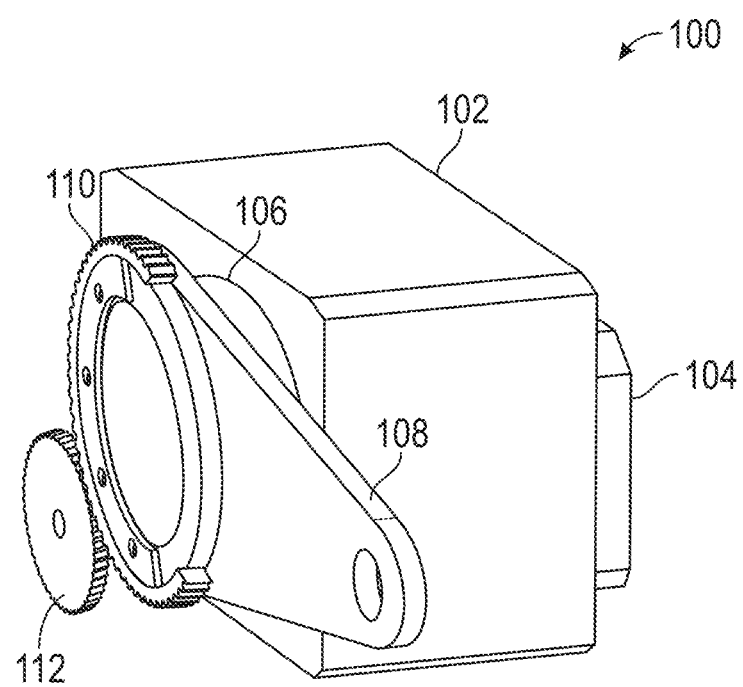
FIGS. 1A-1C illustrate different views of exemplary aircraft control modules in accordance with embodiments of the disclosure.

This disclosure relates to aircraft control systems and, in particular, to systems for electronically controlling the lever position of aircraft control systems. There exists a need for an aircraft control system that mimics the traditional feel of conventional mechanical aircraft control systems without the disadvantages of a mechanical aircraft control system.

In some embodiments, an aircraft control system comprises: a motor comprising a rotating shaft; a lever comprising an axis of rotation, the lever connected to the rotating shaft; a sensor identifying a position of the lever; and a transmitter transmitting the lever position to a controller, the controller adjusting an aircraft performance device based on the received lever position. In some embodiments, the aircraft control system implements a single motor assembly. In some embodiments, an aircraft control system can comprise multiple motor assemblies (e.g., two motors, two levers, two sensors and two transmitters). Thus, in some embodiments, each motor assembly can be referred to as an aircraft control module.

In some embodiments of the aircraft control systems described herein, the control systems described herein may advantageously negate nonlinearities in throttle lever force caused by kinematic relationships. In some embodiments of the aircraft control systems described herein, the control systems described herein may advantageously create a progressive and/or regressive throttle force. In some embodiments of the aircraft control systems described herein, the control systems described herein may advantageously provide airspeed warning shakes on the lever. In some embodiments of the aircraft control systems described herein, the control systems described herein may advantageously provide dynamically adjustable simulated detents (e.g., electronic and/or software simulated detents). In some embodiments of the aircraft control systems described herein, the control systems described herein may advantageously provide a larger operating envelope. In some embodiments of the aircraft control systems described herein, the control systems described herein may advantageously provide electronic hard stops.

In some embodiments, the motor comprises an encoder commutated brushless DC motor using field oriented control. In some embodiments, no clutches are positioned between the lever and the motor and the elimination of the clutch may advantageously provide longer life, lower weight, and lower cost.

As described above, exemplary aircraft control systems in accordance with example of the disclosure include an electrically driven motor coupled with one or more sensors. In some embodiments, the one or more sensors can be an encoder coupled to the motor (e.g., a servomotor) and/or a global positioning gear coupled to a global positioning encoder. In some embodiments, the motor can be controlled by a controller or any other external electronic control system. Because the motor is electrically driven and controlled, any number of functions are available. In some embodiments, any of the sensors can transmit information data, such as the lever position, using a transmitter, to the controller. For example, during autopilot, autothrottle, or any other automatic control state, the controller and/or any other aircraft control unit can drive and/or otherwise control the motor. In some embodiments, the transmitter is an electrical communication system that transmits signals from the sensors to the controller. In some embodiments, the transmitter is a mechanical link that transmits signals to the controller and/or directly to the system being controlled. In some embodiments, the motor is used to control the position (e.g., rotate and/or otherwise move) of any attached levers. In some embodiments, the rotation of the motor is controlled electronically by the controller such as an electronic control unit. In some embodiments, the electronic control unit receives feedback from the sensors (e.g., via the transmitters) to determine whether the motor has rotated or otherwise moved to the intended or predicted position. In some embodiments, the sensors can determine that the intended or predicted position is not the same as the actual position of the motor. In some embodiments, when there is a discrepancy between the predicted and actual positions of the motor, an electronic control unit can respond in any number of ways.

In some embodiments, an electronic control unit can determine that a user has taken control of the aircraft control system and/or otherwise overridden the automated system. For example, the motor can attempt to rotate the aircraft control system (e.g., an attached lever such as a throttle lever) 30 degrees, but a pilot or other user can hold or move the lever to prevent the aircraft control system from rotating the full amount. In such examples, the pilot may prefer to move the throttle lever only 10 degrees. In some examples, the position or rotation of the motor can be overridden without damage to the motor because of the electromagnetic construction of the motor (e.g., overriding the motor causes the rotor to "skip" but does not cause any mechanical wear). Thus, the encoder and/or the global positioning encoder can determine that there is a 20 degree discrepancy between the intended or predicted position of the motor and the actual position of the motor. In some embodiments, the electronic control unit is able to determine, based on the discrepancy, that the pilot has overridden the automated system. Thus, the electronic control unit can automatically disable the automated system (e.g., remove rotational power from the motor, except to provide a minimal level of torque or force feedback, as described in this disclosure). In some embodiments, automatically disabling the automated system involves disengaging and/or otherwise disabling an automatic control mode. For example, when the pilot or user releases control, the electronic control unit can determine that the user has released control, but maintain the final position of the aircraft control system (e.g., accept the pilot's override as the preferred position or setting, or target position or setting). In some embodiments, the electronic control unit can leave the automated system enabled and continue to "test" for whether the pilot has released the control, at which point, the automated system regains control, taking into account any changes due to the pilot's inputs. For example, when the difference between the sensed position of the lever and the predicted position of the lever indicates that the user has manually overridden the aircraft control system and when the processor determines that the user has released the control, the processor can update a parameter of the system (e.g., adjust or otherwise update the predicted position of the lever, adjust or otherwise update the target throttle position, etc.).

In some embodiments, depending on the amount of discrepancy between the predicted position and the actual position of the aircraft control module (e.g., if the discrepancy is minimal or within a certain amount of tolerance and/or does not otherwise suggest pilot override), the electronic control unit can determine that rather than pilot or user override, the system is functioning normally (e.g., the error is within a tolerance) or possibly that there is an error or failure in the aircraft control module (e.g., the error is above a tolerance but below a threshold that suggests pilot override). In some embodiments, the threshold for determining that the pilot has overridden the controls is a spatial threshold (e.g., the angular difference is above the spatial threshold). In some embodiments, the threshold for determining that the pilot has overridden the controls is a temporal threshold (e.g., a difference exists for more than a threshold amount of time). In some embodiments, the electronic control unit can issue an alert to inform the pilot or user that there is an error in the system or that maintenance of the system is required. In some embodiments, when the actual position of the aircraft control module does not change when the predicted position suggests that the aircraft control module should be moving, the electronic control unit can determine that the shear pins have sheared and the aircraft control module no longer has control of the levers.

In some embodiments, the electronic control unit can determine that the pilot or user has overridden the aircraft control module by determining the discrepancy between the sensed velocity and the anticipated or predicted velocity of the aircraft control module (e.g., if the discrepancy is above a threshold). In some embodiments, the electronic control unit can determine that the pilot or user has overridden the aircraft control module by determining the discrepancy between the sensed acceleration and the anticipated or predicted acceleration of the aircraft control module (e.g., if the discrepancy is above a threshold). In some embodiments, the electronic control unit can determine that the pilot or user has overridden the aircraft control module by determining the discrepancy between the sensed jerk and the anticipated or predicted jerk of the aircraft control module (e.g., if the discrepancy is above a threshold). In some embodiments, the electronic control unit can determine that the pilot or user has overridden the aircraft control module by using any combination of the above methods.

In some embodiments, when the system is not in autopilot, autothrottle or other automatic control mode, and/or when the pilot is taking manual control of the system, the aircraft control module provides a certain amount of torque (e.g., resistance against or assistance with) to the pilot or user's motion. In some embodiments, the torque is provided by driving the motor to maintain a rotational position. In some embodiments, resistance is provided by driving the motor in the opposite rotational direction as the direction that the pilot or user is attempting. Thus, different amounts of resistance or torque can be provided by the motor. In some embodiments, the resistance or torque is meant to provide the pilot or user a tactile feedback as the pilot or user moves or otherwise operates an attached control. For example, a pilot or user may be accustomed to exerting a certain amount of force to move a respective lever or control. Thus, in some embodiments, the aircraft control module of this disclosure can provide a certain amount of resistance to give the pilot or user the feeling that the pilot or user is accustomed to. In some embodiments, this resistance is dynamically adjustable. For example, a knob or lever can be attached to an aircraft control system to dynamically adjust the amount of base level resistance provide up or down. In some embodiments, a different amount of resistance can be provided by the aircraft control module at different angular or rotational positions of the motor. In some embodiments, this can be referred to as a torque function (e.g., the torque as a function of the angular or rotational position and/or other factors). In some embodiments, the angular or rotational position of the motor can be determined by a global positioning gear (such as global positioning gear 112) and its accompanying global rotational positioning encoder. In some embodiments, the global positioning gear and its accompanying global positioning encoder can provide information regarding the global angular position of the aircraft control module. In some embodiments, using this global angular position data, the aircraft control module and/or an electronic control unit can provide the intended amount of resistance for the respective global angular position. In some embodiments, the aircraft control module and/or an electronic control unit can use the global angular position data and/or the rotational data from the encoder of the motor (e.g., current data and/or historical data) to determine the position, speed of rotation, acceleration of rotation and/or direction of rotation of the aircraft control module.

In some embodiments, the torque (e.g., resistance or assistance) provided by the aircraft control module can simulate a hard wall, a force spring, and/or detents. In some embodiments, a hard wall can be simulated by providing the maximum amount of resistance against the movement of a user or pilot. As used herein, a hard wall is defined as a rotational position that a user should not move beyond (e.g., analogous to a literal wall or stopper in a mechanical system). In some embodiments, a force spring can be simulated by providing a linearly increasing resistance as the pilot or user moves the system beyond a certain rotational position or within a certain rotational range. In some embodiments, a linearly decreasing resistance can be simulated as the pilot or user moves the system beyond a certain rotational position or within a certain rotational range. In some embodiments, the amount of torque can be reduced below zero. In other words, the motor can linearly reduce the torque (e.g., resistance) against the pilot or user's movement up to a certain rotational position threshold at which the motor will reverse the rotational force and begin to assist the pilot and/or user to move into a certain position (e.g., assistance/"negative" resistance). In some embodiments, the motor can produce an oscillation or shaking against the pilot's motion when the aircraft control module approaches the upper limit (e.g., the aircraft's performance limit).

In some embodiments, a detent can be simulated by the aircraft control module. As used herein, a detent is defined as a catch in the motion of a system that sets the system in a certain position. In some embodiments, detents can be placed in preferred positions and/or "bookmarked" positions. For example, a detent can be placed at the 25%, 50%, and 75% positions (e.g., corresponding to 45 degrees, 90 degrees and 135 degree positions in a system with a 180 degree travel range) to provide a pilot or user with tactile feedback that the system has reached those positions. In some embodiments, the aircraft control module can simulate a detent by simulating a local minimum of torque (e.g., resistance or assistance) at a particular rotational position. For example, at the 85 degree position, the aircraft control module can begin reducing the torque (e.g., reducing the resistance provided against the control or increasing the assistance provided to the control) and at the 90 degree position (e.g., at the "trough"), the aircraft control module can provide little resistance, no resistance, or negative resistance (e.g., assistance). For example, at 85 degrees, the aircraft control module can pull lever towards the 90 degree position (e.g., provide "assistance" towards the 90 degree position). At above 90 degrees, the aircraft control module can begin providing increased resistance against upward movement (e.g., pulling the lever back towards the 90 degree position) until 95 degrees, at which point the aircraft control module reaches the base level of resistance. Thus, in some embodiments, the pilot or user feels a detent at the 90 degree position such that the system appears to "catch" at the 90 degree position (e.g., a local minimum of torque at the 90 degree position). In some embodiments, a detent can be simulated using increased resistance on one or both sides of the "trough" in order to exaggerate the boundaries of the detent. In some embodiments, the resistance curve can be different depending on the direction that the control is moving. For example, in some embodiments, entering a detent while moving "up" (e.g., rotationally upwards) can encounter a sinusoidally increasing resistance level (e.g., from the base level of resistance) followed by a sinusoidally decreasing resistance level (e.g., to the trough level of resistance). However, in some embodiments, exiting the detent while moving "down" (e.g., rotationally downwards) can encounter only a linear increase in resistance from the trough to the base level of resistance (e.g., without encounter a resistance level above the base level of resistance as was encountered during the upwards motion). Thus, although the aircraft control module traverses the same rotational positions, the resistance provided by the aircraft control module can be different based on the direction of motion.

Thus, in some embodiments, the torque (e.g., resistance or assistance) provided by the aircraft control module can be a function of rotational position, rotational speed (e.g., how fast the user is rotating the lever), rotational acceleration (e.g., the change in the speed (i.e., acceleration rate) of the user's rotation of the lever), and rotational direction (e.g., the direction that the user is rotating the lever). In some embodiments, the resistance provided can also depend on the state of the aircraft. For example, during take-off, landing, and cruising, the aircraft control module can provide different torque functions (e.g., different base resistances, different detent positions, etc.). In some embodiments, the torque (e.g., entire torque function and/or instantaneous resistance at the current position of the lever) can be dynamically adjusted based on the angle of attack of the aircraft. In some embodiments, the resistance provided can also depend on environmental conditions experienced by aircraft (e.g., turbulence). For example, in some embodiments, the aircraft control module is a part of a larger system which receives information from multiple aircraft sensors and dynamically changes the behavior of the aircraft control module based on inputs from the aircraft sensors. These and other arbitrary torque functions are contemplated and can be achieved by the aircraft control module due to the implementation of an electronic motor system.

In some embodiments, the amount of torque provided by the aircraft control module simulates the physical features to mimic a conventional throttle lever. In some embodiments, as described above, force feedback algorithms of the controller can be designed to mimic physical clutches, detents, and more. In some embodiments, the motor control is used to imitate a mechanical detent. Unlike mechanical detents, the location of detents in some embodiments can be varied. For example, an N1 detent could be electronically placed in the throttle range and its location updated as the N1 value is recalculated, thus allowing the pilot to "feel" the optimum throttle placement for any given situation.

In some embodiments, the aircraft control system further comprises a fail-safe system for maintaining mechanical friction of the lever in an event of a failure. In some embodiments of the aircraft control systems described herein, the fail-safe system comprises a current sensor coupled to the motor (e.g., to detect the amount of electrical current drawn by the motor) and a failure can be determined when the current reading from the current sensor is above an upper threshold or is below a lower threshold. In some embodiments of the aircraft control systems described herein, the fail-safe system comprises shear pins and the event of a failure comprises a manual torque on the lever sufficient to break the shear pins. In some embodiments of the aircraft control systems described herein, the shear pins are an interface between the motor (e.g., via the inner shear hub) and the output arms (e.g., outer shear hub) of the motor. In some embodiments of the aircraft control systems described herein, a failure comprises at least one of a motor failure or a jam.

Figure 1B:
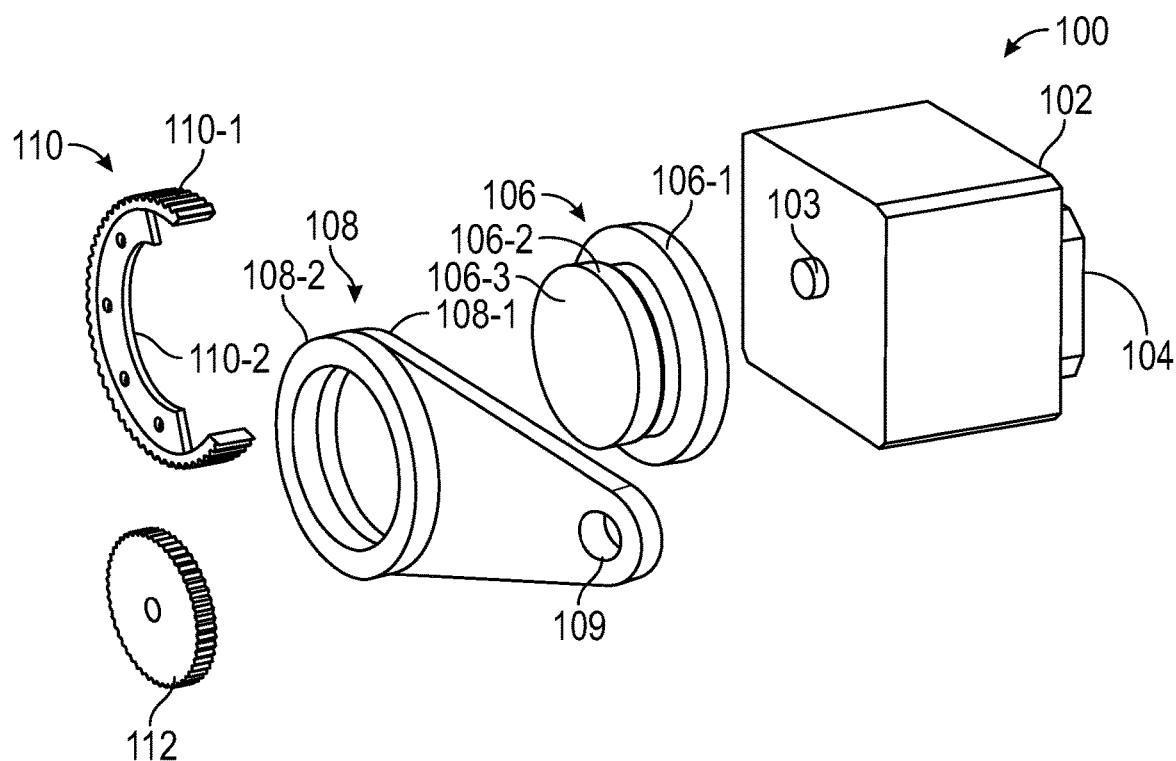

FIG. 1A illustrates an exemplary aircraft control module 100 in accordance with embodiments of the disclosure. In some embodiments, aircraft control module 100 includes motor 102, encoder 104, inner shear hub 106, output arm 108, gear cap 110, and global positioning gear 112. In some embodiments, motor 102 drives (e.g., rotates) a rotating shaft (e.g., as shown in FIG. 1B). In some embodiments, the rotating shaft has a particular axis of rotation and is coupled to inner shear hub 106. In some embodiments, inner shear hub 106 acts as an adapter between motor 102 and output arm 108 (e.g., is coupled to the rotating shaft at the first side and to output arm 108 at the second side). In some embodiments, output arm 108 is also known as an outer shear hub. For example, as will be explained in further detail below, inner shear hub 106 is inserted into output arm 108. In some embodiments, output arm 108 is coupled to gear cap 110 which covers a portion of output arm 108. In some embodiments, gear cap 110 covers the exterior portion of output arm 108. In some embodiments, gear cap 110 provides a geared interface (e.g., gear teeth) for the circular portion of output arm 108. In some embodiments, gear cap 110 is coupled to global positioning gear 112 (e.g., the teeth of gear cap 110 are enmeshed with the teeth of global positioning gear 112). In some embodiments, global positioning gear 112 is coupled to a global positioning encoder (e.g., as shown in FIG. 6B). In some embodiments, the global positioning encoder can transmit the global position of the output arm (and any attached mechanism) to the electronic control unit.

In some embodiments, motor 102 includes a rotor and a stator (not shown). In some embodiments, the stator comprises a series of electromagnetic elements arranged in a circular pattern inside the motor. In some embodiments, the rotor comprises a cylindrical rod. In some embodiments, the cylindrical rod of the rotor includes a series of electromagnetic elements. In some embodiments, the electromagnetic elements on the rotor complement the electromagnet elements on the stator. In some embodiments, the electromagnetic elements of the stator can be electrically controlled to create a magnetic field with a particular pattern to cause the rotor to rotate within the motor. Thus, in some embodiments, motor 102 can receive an electrical signal to cause the rotor to rotate in a clockwise or counter-clockwise direction. In some embodiments, the rotor can include a rotating shaft that protrudes from the body of motor 102. In some embodiments, the rotating shaft spins or rotates when the shaft in motor 102 rotates. In some embodiments, one or more internal gears can be coupled between the rotor and the rotating shaft such that multiple rotations of a rotor can translate into one rotation of the output rotating shaft. In some embodiments, rotating shaft is coupled externally to a gearhead (not shown) before coupling to inner shear hub 106 (e.g., as will be described below with respect to FIG. 6B). In some embodiments, the gearhead (e.g., gearbox) includes one or more gears to change the output properties of motor 102 (e.g., torque and/or rotational speed). For example, the gearhead can translate one rotation of motor 102 into a half rotation that is ultimately transmitted to inner shear hub 106 (e.g., and thus increasing the torque of motor 102 accordingly).

In some embodiments, the rotating shaft of motor 102 is directly coupled to inner shear hub 106 (e.g., without a gearhead or gear box). In some embodiments, inner shear hub 106 acts as an adapter for the rotating shaft and transfers the torque (e.g., rotational force) from the rotating shaft to output arm 108. For example, when rotating shaft rotates, inner shear hub 106 and output arm 108 rotate correspondingly. In some embodiments, inner shear hub 106 is cylindrical and can include multiple sections with different radii. In some embodiments, the radius of a portion is the same radius as the inner-circle of output arm 108 such that a portion of inner shear hub 106 can be inserted and secured into the inner-circle of output arm 108. In some embodiments, a larger radius portion of inner shear hub 106 acts as a backstop such that inner shear hub 106 is inserted into output arm 110 (e.g., outer shear hub) only to the desired amount and is stably coupled to output arm 110. In some embodiments, as will be described in more detail below, inner shear hub 106 is coupled to output arm 108 via one or more shear pins inserted into and through output arm 108 and into inner shear hub 106.

In some embodiments, output arm 108 is a mechanical element that extends the radius of the rotational motion of motor 102. In some embodiments, output arm 108 has an annulus portion (e.g., ring shaped) and a triangular portion (e.g., extension portion). In some embodiments, the annulus portion of output arm 108 is coupled to inner shear hub 106. In some embodiments, the radius of the inner-ring is the same or substantially the same radius as the smaller portion of inner shear hub 106. As described above, because the radius of the inner-ring is the same or substantially the same as the smaller portion of inner shear hub 106, the smaller portion of inner shear hub 106 can be inserted into the inner-ring of the annulus portion of output arm 108. In some embodiments, as will be explained in more detail below, inner shear hub 106 can be secured inside the annulus using pins (e.g., shear pins), screws (e.g., shear pins with threads), set screws, dowels, or any other suitable mechanism, or a combination of the foregoing.

In some embodiments, the triangular portion (e.g., extension portion) of control output arm 108 extends outwards from the annulus portion of output arm 108. In some embodiments, the triangular portion of output arm 108 has a bolt hole at the far end of the triangular portion for attaching to a control rod or a throttle lever. Thus, the rotational movement of the motor can be translated to a corresponding rotational movement in an attached throttle lever. For instance, an attached control rod or throttle lever can experience the same angular rotation as the angular rotation experienced by output arm 108.

Figure 4:
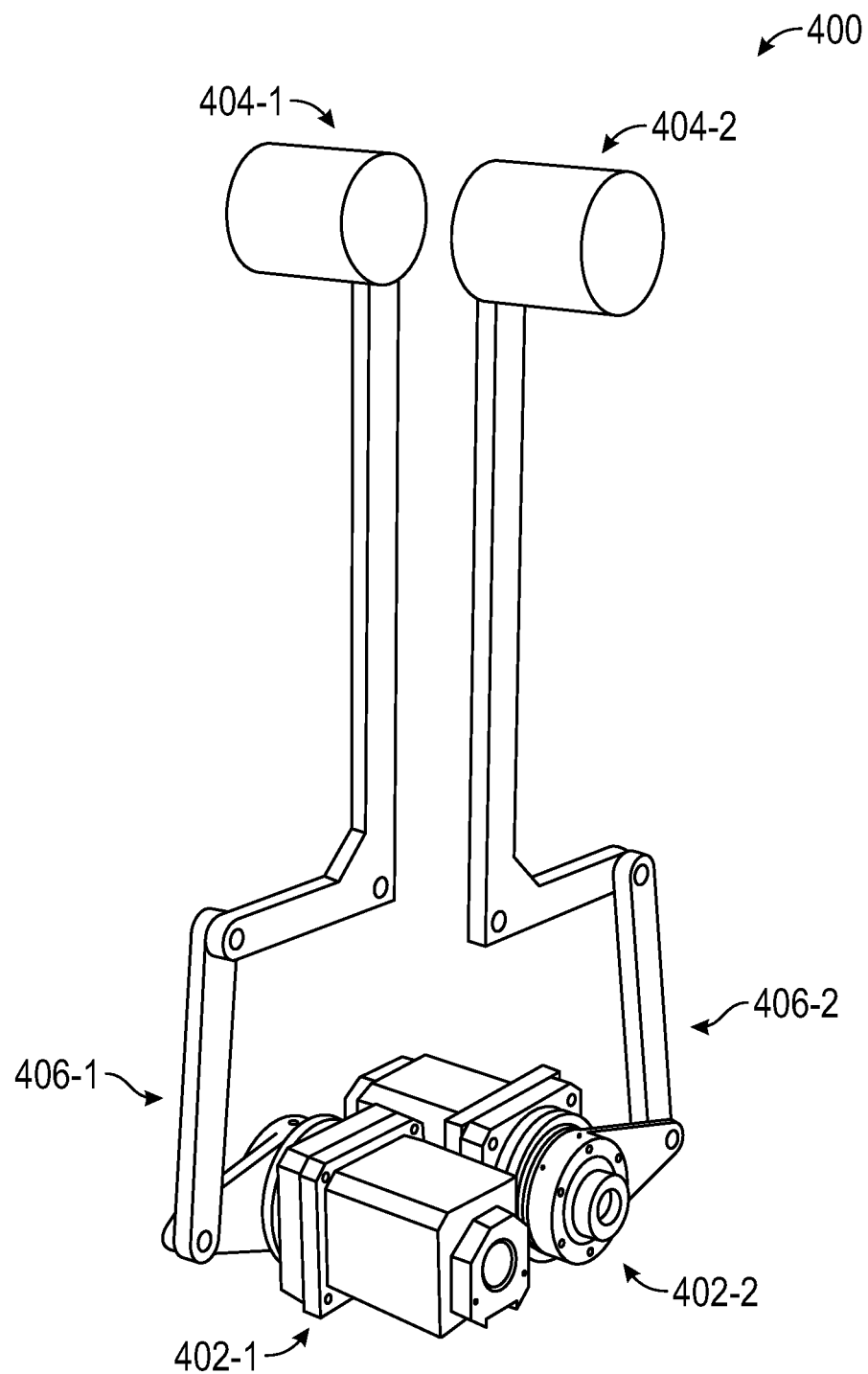
FIG. 4 illustrates an exemplary aircraft control system implementing exemplary aircraft control modules in accordance with examples of the disclosure.

In some embodiments, motor 102 can be electrically driven by an electronic control unit (not shown). In some embodiments, motor 102 can rotate the rotating shaft of motor 102 in response to an electrical signal from the electronic control unit. In some embodiments, when the rotating shaft is coupled to inner shear hub 106 and output arm 108, motor 102 causes a rotation in inner shear hub 106 and output arm 108. In some embodiments, when output arm 108 is coupled to a throttle lever (e.g., as shown in FIG. 4), the motor causes a rotation or other proportional movement in the throttle lever. In some embodiments, thus, motor 102 can provide feedback (e.g., visual and/or tactile) to the pilot or user of aircraft control module 100. For example, during autothrottle operation, aircraft control systems can increase, decrease, or maintain an aircraft throttle setting. In some embodiments, when an autothrottle system increases or decreases an aircraft's throttle setting, an electrical signal can be sent to motor 102 (e.g., which is attached to a throttle lever) and the position of the throttle lever can be updated to reflect the changing throttle setting (e.g., moved "upwards" to reflect an increasing throttle setting or moved "downwards" to reflect a decreasing throttle setting). In some embodiments, motor 102 can maintain a throttle position (e.g., throttle setting). For example, during autothrottle operation, the aircraft control system can determine to maintain an aircraft throttle. In such examples, the motor can be driven with an electrical signal to hold the current position of the throttle lever. In some embodiments, maintaining the current position of the throttle lever includes providing resistance against a pilot or user attempting to move the throttle lever. In some embodiments, the resistance provided by the motor can mimic the friction and/or resistance provided by a mechanical clutch on traditional mechanical systems.

In some embodiments, the annulus portion of output arm 108 is wider than the triangular portion of output arm 108. Thus, in some embodiments, one portion of the annulus is cylindrical while the other portion of the annulus extends outwards into the triangular portion. In some embodiments, gear cap 110 can be secured onto the cylindrical section of the annulus (e.g., the portion that does not extend outwards into the triangular portion). In some embodiments, gear cap 110 has the same radius as the outer-ring of the annulus. In some embodiments, gear cap 110 is semi-circular. In some embodiments, gear cap 110 has gear teeth on the exterior side of the semi-circle. In some embodiments, gear cap 110 has a side-wall that is perpendicular to the gear teeth and configured to attach gear cap 110 to output arm 108. In some embodiments, gear cap 110 fits onto the cylindrical section of the annulus using screws, bolts, or other fasteners. In some embodiments, the side-wall of gear cap 110 has one or more screw or bolt holes. In some embodiments, one or more screws or bolts are fastened through the side-wall of gear cap 110 into the side of the end of output arm 108. In some embodiments, other fastening mechanism can be used. In some embodiments, the width of the side-wall of gear cap 110 is the same as the width of the side of output arm 108 (e.g., the width of the annulus). Although FIG. 1A illustrates gear cap 110 as coupled onto the "back" side (e.g., the side opposite of the triangular portion) of output arm 108, it is understood that gear cap 110 can be coupled onto any side of the cylindrical edge of output arm 108 as is required by design needs.

In some embodiments, fastening gear cap 110 onto output arm 108 adds gear teeth to the exterior of output arm 108. In some embodiments, the gear teeth are coupled to the teeth of global positioning gear 112. In some embodiments, global positioning gear 112 is used to detect the global rotational position of output arm 108. In some embodiments, detecting the global rotational position of output arm 108 allows a control system to monitor or determine the absolute position of a throttle lever or control lever that is attached to output arm 108. In some embodiments, motor 102 includes multiple internal gears such one single rotation of output arm 108 does not translate into a single rotation of the rotor of motor 102. Thus, in some embodiments, detecting the rotation of the rotor of motor 102 (e.g., by encoder 104) does not provide the global rotational position of output arm 108 (and thus the throttle lever or control lever attached to output arm 108). For example, the rotor of motor 102 can rotate 10 times to cause one single rotation of the rotating shaft (and thus one single rotation of output arm 108). In such examples, encoder 104 coupled to motor 102 can determine that motor 102 is rotating clockwise or counter-clockwise, the speed of rotation, and how much the motor has rotated, but because multiple rotations do not necessarily translate into the same amount of rotations in output arm 108, encoder 104 may not definitively be able to determine the position of output arm 108. Thus, another mechanism is needed to determine the absolute global rotational position of the output arm.

Thus, in some embodiments, a potentiometer or encoder (e.g., global positioning encoder) can be coupled to global positioning gear 112 to determine the global rotational position of output arm 108. As will be described in further detail below, determining the global rotational position of output arm 108 allows control systems to monitor, control, or adjust the behavior of motor 102 at different global rotational positions. For example, more or less torque can be provided at different global rotational positions and/or detents and hard walls can be simulated at different global rotational positions. In some embodiments, the global positioning encoder can send or otherwise transmit information to a control system or controller, such as an electronic control unit.

FIG. 1B illustrates an exploded view of an exemplary aircraft control module 100 in accordance with embodiments of the disclosure. In some embodiments, aircraft control module 100 includes motor 102, encoder 104, inner shear hub 106, output arm 108, gear cap 110, and global positioning gear 112. As described above, in some embodiments, motor 102 is coupled to encoder 104. In some embodiments, motor 100 drives rotating shaft 103, which is coupled to inner shear hub 106. In some embodiments, inner shear hub 106 is coupled to output arm 108. In some embodiments, output arm 108 is coupled by gear cap 110, whose teeth are enmeshed with the teeth of global positioning gear 112.

As illustrated in FIG. 1B, inner shear hub 106 comprises three sections 106-1, 106-2, and 106-3. In some embodiments, each of the three sections is cylindrical and has different radii. In some embodiments, the first section 106-1 of inner shear hub 106 has the largest radius and acts as a back-wall to when inner shear hub 106 is inserted into and coupled with output arm 108. In other words, the radius of the first section 106-1 of inner shear hub 106 is larger than the radius of the inner-circle of output arm 108. In some embodiments, the larger radius controls how far inner shear hub 106 can be inserted into output arm 108 and prevents inner shear hub 106 from being inserted too far into output arm 108.

Figure 1C:
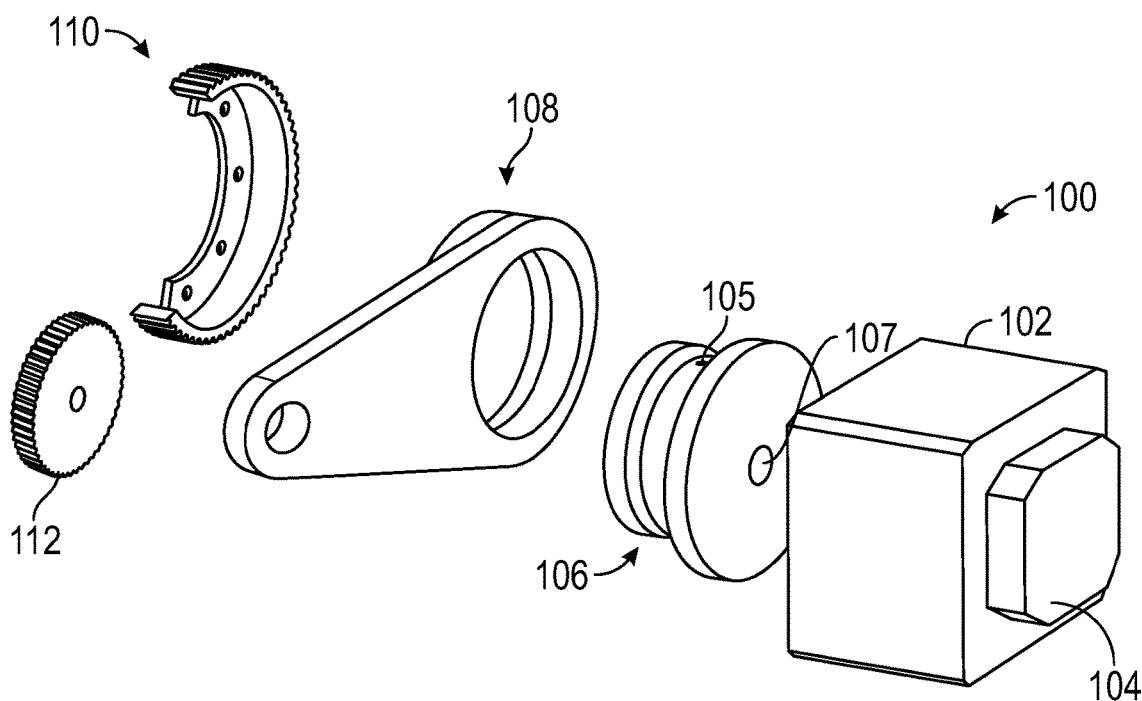
Figure 2A:
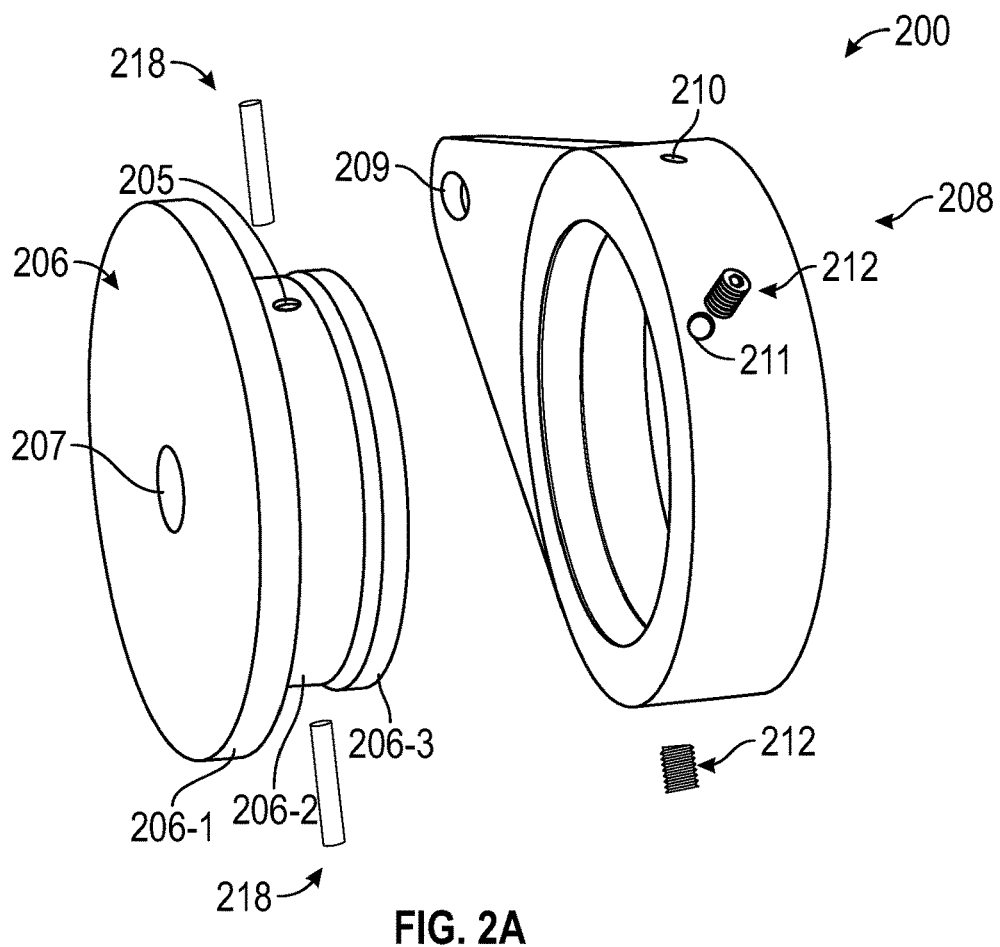
FIGS. 2A-2B illustrate exemplary coupling mechanisms for shear hubs of exemplary aircraft control systems in accordance with embodiments of the disclosure.
Figure 2B:
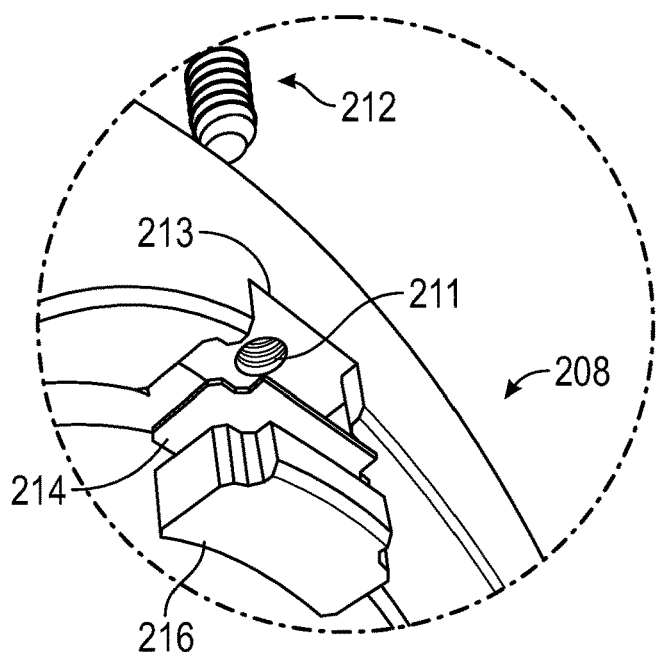

In some embodiments, the second section 106-2 of inner shear hub 106 has the smallest radius. In some embodiments, as will be described in further detail, the smaller radius of the second section 106-2 of inner shear hub 106 allows inner shear hub 106 to be coupled to output arm 108 securely. In some embodiments, output arm 108 includes friction pads (e.g., as shown in FIG. 2B) that can be clamped onto the second section 106-2 of inner shear hub 106. In some embodiments, the width of the second section 106-2 of inner shear hub 106 is the same width as the friction pads of output arm 108. Thus, when inner shear hub 106 is inserted into output arm 108 (e.g., outer shear hub), the friction pads can be clamped flush onto the second section 106-2 of inner shear hub 106 and prevent inner shear hub 106 from disconnecting from output arm 108. In some embodiments, the second section 106-2 of inner shear hub 106 includes one or more holes (e.g., as shown in FIG. 1C and FIG. 2A). In some embodiments, one or more shear pins are inserted into the one or more holes to couple inner shear hub 106 to output arm 108. In some embodiments, the shear pins are inserted through the holes in the outer ring of output arm 108 into the holes in the inner shear hub 106.

In some embodiments, the third section 106-3 of inner shear hub 106 has a radius larger than the second section 106-2 of inner shear hub 106, yet smaller than the first section 106-1 of inner shear hub 106. In some embodiments, the third section 106-3 of inner shear hub 106 serves to allow the friction pads on output arm 108 to fit snugly into the second section 106-2 of inner shear hub 106. In some embodiments, the radius of the third section 106-3 of inner shear hub 106 is the same or a slightly smaller radius than the radius of the inner-ring of output arm 108. Thus, in some embodiments, the third section 106-3 of inner shear hub 106 allows inner shear hub 106 to fit snugly into output arm 108.

As illustrated in FIG. 1B, output arm 108 comprises two sections, 108-1 and 108-2. In some embodiments, the first section 108-1 comprises an annulus portion (e.g., "shear hub" portion) and a triangular portion (e.g., "output" portion) that extends outwards from the annulus portion. In some embodiments, the inner-radius of the annulus is the same or substantially the same radius as the third section 106-3 of inner shear hub 106 such that inner shear hub 106 can be inserted and secured into the annulus. In some embodiments, the triangular portion extends outwards from the annulus such that a control arm or other mechanism can be attached to the end of the triangular portion such that when output arm 108 rotates (e.g., due to motor 102 rotating or an external force such as a pilot input causing output arm 108 to rotate), the control arm or other mechanism that is attached to output arm 108 does not interfere with the motor assembly (e.g., motor 102 and any housing around motor 102). In some embodiments, the triangular portion can be any length and can be any shape. For example, the triangular portion can be rectangular. In some embodiments, the end of the triangular portion includes a screw or bolt hole 109 to allow the attachment of a control arm or other mechanism (e.g., via a screw, bolt, or other fastening mechanism). Although FIG. 1B illustrates the triangular portion of the output arm 108 as a solid piece (but for the screw or bolt hole 109), it is understood that the triangular portion can be machined to remove portions of metal to reduce weight.

As illustrated in FIG. 1B, gear cap 110 is a circular structure (e.g., a cylinder or an arc) that can be attached to the exterior of output arm 108. In some embodiments, gear cap 110 includes curved strip 110-1 comprising gear teeth on the exterior of curved strip 110-1. In some embodiments, the interior of curved strip 110-1 is smooth and/or textured to improve contact with output arm 108. In some embodiments, gear cap 110 includes side-wall 110-2 on one end of curved strip 110-1 that is perpendicular to curved strip 110-1. In some embodiments, side wall 110-2 extends the entire length of curved strip 110-1. In some embodiments, side wall 110-2 extends only partially along the length of curved strip 110-1. In some embodiments, the width of side wall 110-2 is the same, substantially the same, or smaller than the width of the annulus portion of output arm 108 (e.g., the distance between the inner-ring and the outer-ring of the annulus). In some embodiments, side wall 110-2 includes one or more screw or bolt holes. In some embodiments, one or more screws or bolts can be inserted through side wall 110-2 and into the side of the annulus portion of output arm 108 (e.g., into corresponding screw or bolt holes). In some embodiments, gear cap 110 is attached to the second section 108-2 of output arm 108. In some embodiments, the second section 108-2 comprises only the annulus (e.g., does not include any portion extending outwards from the annulus). In some embodiments, the width of the curved strip 110-1 is the same as the width of the second section 108-2 of output arm 108. In some embodiments, curved strip 110-1 covers the entire width of the second section 108-2 of output arm 108. In some embodiments, gear cap can alternatively be attached to the first section 108-1 of output arm 108. In some embodiments, because the width of the side wall is not larger than the width of the annulus, the side wall does not encroach on or obstruct the inner ring of the annulus portion of output arm 108.

In some embodiments, global positioning gear 112 is coupled to gear cap 110 such that the teeth of global positioning gear 112 are enmeshed with the teeth of gear cap 110. In some embodiments, a rotation in gear cap 110 (e.g., due to the rotation of output arm 108) causes a corresponding rotation in global positioning gear 112. In some embodiments, an encoder, potentiometer, or other sensing mechanism (e.g., as shown in FIG. 6B) can be attached to global positioning gear 112 to detect the rotation and/or rotational position of global positioning gear 112. As described above, global positioning gear 112 tracks the global rotational position of output arm 108 (and thus, the corresponding lever or other pilot control system attached to output arm 108). In some embodiments, global positioning gear 112 (in combination with its attached global positioning encoder) provides information to control systems to determine whether motor 102 has properly placed output arm 108 in the expected/predicted position and/or whether the pilot has overridden any automated systems (e.g., autopilot and/or autothrottle) and manually moved the output arm 108 into a different position.

FIG. 1C illustrates an exploded view of an exemplary aircraft control module 100 in accordance with embodiments of the disclosure. In some embodiments, motor 102 includes encoder 104 coupled to the back side of motor 102. In some embodiments, encoder 104 can be coupled to any other side of motor 102. In some embodiments, encoder 104 detects the position and/or rotational speed of the rotor inside motor 102. In some embodiments, encoder 104 provides positional and/or rotational speed feedback. In some embodiments, encoder 104 can generate an error signal to correct the position of motor 102 (e.g., the rotational position of rotating shaft) to the intended position. In some embodiments, encoder 104 can be implemented using a potentiometer or any other suitable rotary encoder. In some embodiments, the combination of motor 102 with encoder 104 is known as a servomotor. In some embodiments, encoder 104 can send or otherwise transmit a signal or motor data to a control system or controller, such as an electronic control unit.

As described above with respect to FIG. 1B, and illustrated in FIG. 1C, inner shear hub 106 includes three sections, each with three different radii. In some embodiments, inner shear hub 106 includes a port 107 into which the rotating shaft of motor 102 (not shown) can be inserted and coupled to cause inner shear hub 106 to rotate with the rotation of the rotating shaft. In some embodiments, as described above, the second section of inner shear hub 106 includes one or more holes 105 to accommodate one or more shear pins.

FIG. 2A illustrates an exemplary coupling mechanism for inner shear hub 206 and output arm 208 of an exemplary aircraft control system 200 in accordance with embodiments of the disclosure. It is understood that inner shear hub 206 and output arm 208 are similar to inner shear hub 106 and output arm 108 of aircraft control system 100 and other elements of the aircraft control system are omitted for ease of description and illustration.

As described above, in some embodiments, inner shear hub 206 has three sections 206-1, 206-2, and 206-3, each with a different radius. In some embodiments, the first section 206-1 has the largest radius. In some embodiments, the radius of the first section 206-1 is larger than the radius of the inner-ring of output arm 208 such that the first section 206-1 acts as a stopper for when inner shear hub 206 is inserted into output arm 208. In some embodiments, the second section 206-2 has the smallest radius and accommodates the friction pads of output arm 208 (e.g., as shown in FIG. 2B), as will be described in more detail below. In some embodiments, the third section 206-3 has a radius larger than the second section 206-2 and a radius smaller than the first section 206-1. In some embodiments, the larger radius of the third section 206-3 (as compared to the second section) creates a trough in the second section 206-2 for the friction pads from output arm 208 to rest snugly. Thus, in some embodiments, the width of the second section 206-2 of inner shear hub 206 (e.g., as bounded by the first and third sections 206-1 and 206-3) is the same, substantially the same, or slightly wider than the width of the friction pads of output arm 208. In some embodiments, the transition between each of the sections can be abrupt (e.g., transitioning from one radius to the other radius immediately) or can be tapered (e.g., a gradual transition from one radius to another).

In some embodiments, the second section 206-2 of inner shear hub 206 can include one or more holes 205. In some embodiments, holes 205 can be threaded or can be not threaded. In some embodiments, the one or more holes 205 can be placed on opposing sides. In some embodiments, output arm 208 can have corresponding holes 210. In some embodiments, holes 210 on output arm 208 can be threaded or can be not threaded. In some embodiments, holes 210 on output arm 208 align with holes 205 on inner shear hub 206 when inner shear hub 206 is inserted into output arm 208. In some embodiments, shear pins 218 can be inserted through the holes 210 on output arm 208 and secured into holes 205 on inner shear hub 206. In some embodiments, shear pins 218 function to secure inner shear hub 206 to output arm 208 such that any rotation of inner shear hub 206 is translated to a corresponding rotation in output arm 208 (and vice versa).

In some embodiments, shear pins 218 are a type of mechanical torque limiter that is designed to shear (e.g., break, snap, or otherwise separate) when experiencing a shear force (e.g., lateral force and/or other force that is caused by the tangential motion of the inner shear hub relative to the outer shear hub) above a certain shearing threshold. For example, in some examples, a motor can be driving inner shear hub 206 in one direction, but an external force (e.g., a pilot's input) can be driving output arm 208 in a different direction (e.g., manual torque). In some embodiments, the opposing forces can result in a lateral force above the shearing threshold of shear pins 218 and cause the shear pins to shear. In another example, a motor that is driving inner shear hub 206 can experience a failure and become otherwise stuck (e.g., such that it cannot turn in response to electrical control or cannot be turned in response to an external force such as a pilot's input). In such examples, a pilot's force on output arm 208 (e.g., via a control arm or throttle lever) against the stuck motor (and thus a stuck inner shear hub 206) can result in a lateral force above the shearing threshold of the shear pins and cause the shear pins to shear. In some embodiments, shear pins 218 can be threaded (e.g., a screw or bolt) or not threaded (e.g., a dowel).

In some embodiments, when the shear pins shear, inner shear hub 206 becomes decoupled from output arm 208. Thus, in some embodiments, shear pins 218 act as a failsafe mechanism to disconnect output arm 208 (and any attached pilot control) from the failed mechanism (e.g., a stuck or otherwise failed motor). In some embodiments, it is desired to maintain a certain amount of friction (e.g., resistance) on output arm 208 and not allow output arm 208 to dangle or swing freely (e.g., simulated friction). For example, after decoupling inner shear hub 206 from output arm 208, it is desired that output arm 208 still maintain its position when the pilot releases control of the respective lever. Thus, friction pads on output arm 208 (e.g., as shown in FIG. 2B) that have been clamped onto inner shear hub 206 acts as a backup mechanical coupling mechanism and maintains a certain amount of friction between inner shear hub 206 and output arm 208. In some embodiments, the friction pad provides a certain amount of mechanical resistance on output arm 208 (e.g., when the motor driving the inner shear hub 206 is stuck or otherwise not freely rotating). In some embodiments, the resistance provided by the friction pad allows output arm 208 to maintain its position when a pilot releases control of the attached control lever, but allows the output arm 208 to rotate (e.g., despite inner shear hub 206 being unable to rotate) when a pilot takes control of the attached control lever. In some embodiments, as will be described in more detail below, the friction pads are placed on the interior side of output arm 208 and clamped onto inner shear hub 206 by preload screws that are screwed through the sides of output arm 208. In some embodiments, the material of the friction pads and the force provided by the preload screws control the amount of friction provided. It is understood that when the shear pins are not broken or sheared, the shear pins provide the rotational coupling between inner shear hub 206 and output arm 208 such that the friction pad, although clamped onto inner shear hub 206, does not provide any resistance and is not worn during normal operation of the aircraft control module (e.g., because inner shear hub 206 and output arm 208 rotate together as a unit).

In some embodiments, in the event of a failure and the shearing of shear pins 218, the global positioning detection mechanism (e.g., global positioning gear and its encoder) continues to provide information on the global rotational position of output arm 208. Thus, in the event of a failure, the pilot does not lose control of the aircraft control system and the aircraft control module still functions by relying on the global positioning system to provide aircraft control systems with data about the rotational position, and thus, the pilot's control, of the respective levers (e.g., throttle lever).

FIG. 2B illustrates an exemplary coupling mechanism for shear hubs of an exemplary aircraft control system in accordance with embodiments of the disclosure. In some embodiments, the exemplary coupling mechanism comprises a friction pad 216 mechanism of output arm 208. In some embodiments, the interior wall of output arm 208 can include notch 213 in which friction pad 216 is inserted. In some embodiments, notch 213 is keyed such that a complementarily shaped friction pad 216 does not shift in any direction when experiencing lateral forces. In some embodiments, the output arm 208 has a threaded screw hole 211 that is threaded from the exterior wall to the interior wall of output arm 208. In some embodiments, a preload screw 212 is inserted into the threaded screw hole and provides a pushing force on the friction pad to clamp output arm 208 to an inner shear hub (e.g., as shown in FIGS. 1B, 1C, and 2A). In some embodiments, spacer 214 is placed between preload screw 212 and friction pad 216 to spread the force from preload screw 212 evenly across friction pad 216. In some embodiments, spacer 214 can be metallic or polymer based. In some embodiments, friction pad 216 can be nylon or any other suitable material. In some embodiments, the position of preload screw 212 determines the amount of resistive force provided by the friction pad against the inner shear hub. In some embodiments, as illustrated, the edges of friction pad 216 are tapered to match the tapered transition between the sections of the inner shear hub. In some embodiments, the edges of friction pad 216 are not tapered when the transition between the sections of the inner shear hub are abrupt.

Figure 3:
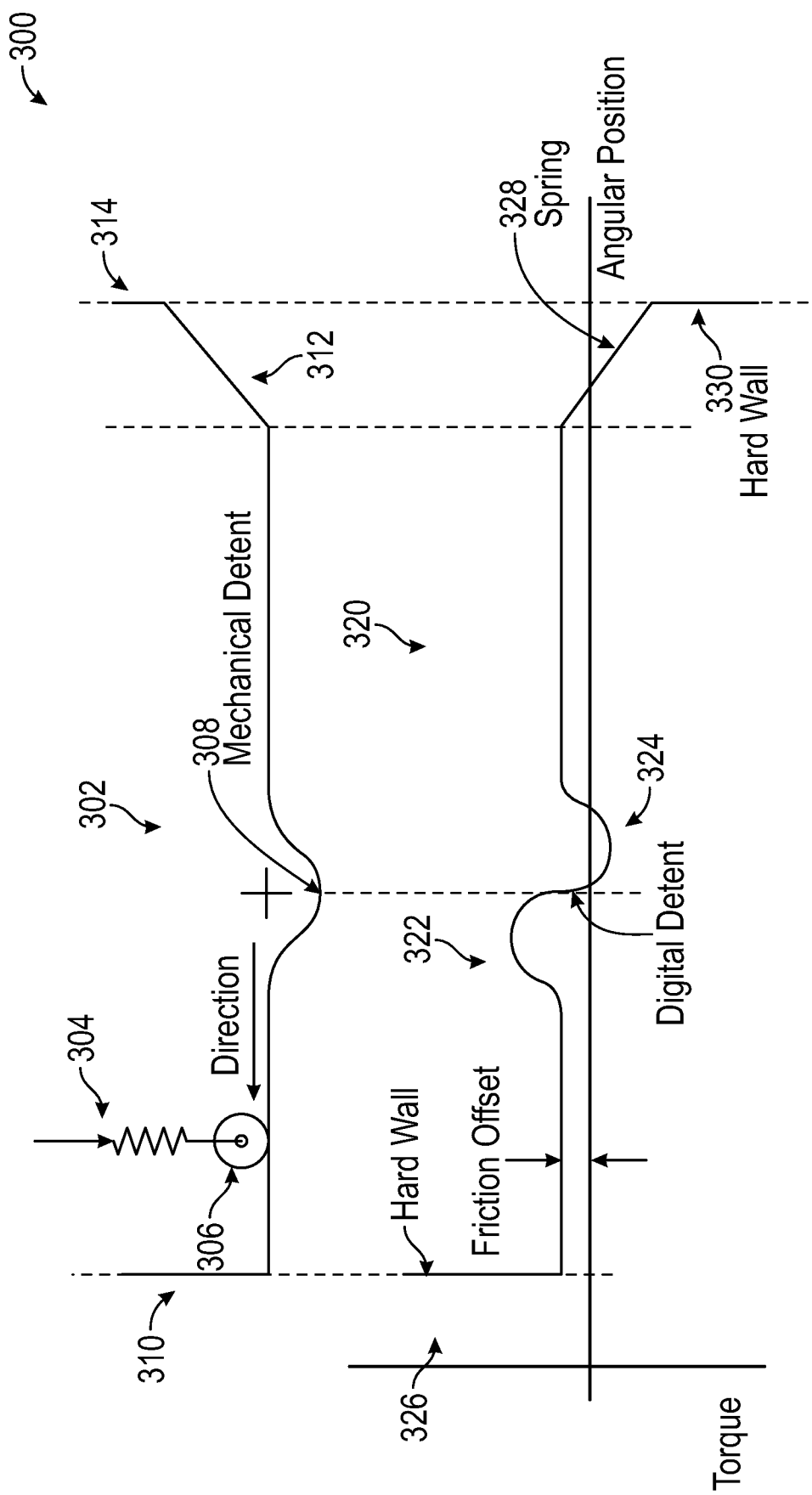
FIG. 3 illustrates an exemplary torque chart of an exemplary aircraft control system in accordance with examples of the disclosure.

FIG. 3 illustrates an exemplary torque chart 300 of an exemplary aircraft control system in accordance with examples of the disclosure. As illustrated, the x-axis of torque chart 300 represents the different angular positions of a respective aircraft control system (e.g., rotational position) and the y-axis of torque chart 300 represents the amount of torque (e.g., resistance) provided by the respective system on the respective aircraft control system (e.g., resisting the user's control of the aircraft control system) at the respective angular position.

In some embodiments, graph 302 illustrates the torque function (e.g., the torque or resistance as a function of the angular position) provided by a conventional mechanical system. In some embodiments, conventional mechanical systems use a roller 306 attached to a spring 304 that rolls along a surface to create resistance. In some embodiments, hard walls 310 and 314 exist at both ends of the movement spectrum. This is implemented by a literal wall (or other physical obstruction) past which roller 306 can no longer be moved. The resistance provided in the flat range is a function of the mechanics of roller 306 (e.g., the ease by which roller 306 rolls along the surface). In some embodiments, mechanical detent 308 is produced using a physical valley or trough into which roller 306 rolls when the pilot or user pushes the lever to the position of the mechanical detent. In some embodiments, the roller is "attracted" into the detent because the spring forces roller 306 to roll into the local minimal (e.g., trough or valley). In some embodiments, the pilot or user must exert force to roll the roller 306 up the slope to exit mechanical detent 308. In some embodiments, at the upper end of the dynamic range of the mechanical aircraft control system, an increasing slope can indicate to the pilot that the pilot is approaching the upper end of the range by increasing the resistance just before the lever reaches hard wall 314.

In some embodiments, graph 320 illustrates an exemplary torque function (e.g., the torque as a function of the angular position) in accordance with examples of the disclosure. It is understood that though a particular function is illustrated in graph 320, as described above, any arbitrary function can be achieved. In some embodiments, a hard wall 326 is simulated by driving the motor against the movement of the pilot when the pilot attempts to move the lever beyond hard wall 326. In some embodiments, in the flat range of the torque function, a predetermined amount of base resistance or torque (i.e., "friction offset") can be simulated by driving the motor to provide a slight resistance against the movement of the pilot (e.g., a base resistance level). In some embodiments, digital detent 324 can be simulated by applying increased resistance at an angular position range just before the detent and a reduced resistance at the center of the detent. In some embodiments, the center of the detent can have a negative resistance value. For example, the motor can reverse the drive direction of the resistance such that the control is "attracted" or otherwise induced into the angular position of the detent. In some embodiments, the torque function includes an increasing resistance at the angular position range just after the detent to simulate an increased force required to exit the position of the digital detent. In some embodiments, the detent can be a "deep" detent (e.g., a large amount of force is required to exit the detent) or a "shallow" detent (e.g., only a small amount of force is required to exit the detent), or a wide detent (e.g., any of the different sections of the detent can extend across a wide range) or narrow detent (e.g., the different sections of the detent can extend across a narrow range). In some embodiments, the aircraft control system can also simulate a force spring 328 at the upper range of the dynamic range by using a negative slope that can cross the 0 position (e.g., the resistance becomes "negative" as described above) such that the lever appears to "click" into the maximum value when reaching the hard wall 330.

It is understood that although graph 320 of torque table 300 illustrates a particular torque function, this is meant only to be illustrative. In some embodiments, because no mechanical components are involved in simulating the resistance of the aircraft control system of this disclosure, the aircraft control system can simulate any kind of torque function. For example, as described above, the torque function can change dynamically. In some embodiments, the torque function can change based on the state of the aircraft or can be adjusted based on the preference of a particular pilot or user. In some embodiments, the aircraft control system can accept a pilot or user's specific customizations and provide a personalized torque function for each pilot or user.

FIG. 4 illustrates an exemplary aircraft control system 400 implementing exemplary aircraft control modules 402-1 and 402-2 in accordance with examples of the disclosure. In some embodiments, aircraft control module 402-1 and 402-2 can be similar to aircraft control module 100 and/or aircraft control module 200. In some embodiments, aircraft control system 400 comprises throttle levers 404-1 and 404-2 and aircraft control modules 402-1 and 402-2. In some embodiments, throttle levers 404-1 and 404-2 include a handle from where the pilot or user can control the position of the throttle levers. For example, an aircraft implementing aircraft control system 400 may be a dual-engine and/or multi-engine aircraft such that the two throttle controls control the throttle of the two or more engines of the aircraft. For example, aircraft control module 402-1 is coupled to throttle lever 404-1 to control the throttle of one of the two engines and aircraft control module 402-2 is coupled to throttle lever 404-2 to control the throttle of the other of the two engines. In some embodiments, aircraft control module 402-1 is coupled to throttle lever 404-1 to control the throttle of the right engine and aircraft control module 402-2 is coupled to throttle lever 404-2 to control the left engine. In some embodiments, each engine can have a corresponding aircraft control module and corresponding throttle lever (e.g., in a four-engine aircraft, the aircraft control system has four aircraft control modules and four throttle levers). In some embodiments, aircraft control module 402-1 is positioned adjacent to aircraft control module 402-2 (e.g., the modules are "stacked"). In some embodiments, the two aircraft control modules face in opposing and outward directions (e.g., such that the motors face outwards and the output arms are on opposing ends of the system).

As illustrated, throttle levers 404-1 and 404-2 are coupled to the output arms of aircraft control modules 402-1 and 402-2. In some embodiments, because output arms of aircraft control modules 402-1 and 402-2 extend outwards (e.g., away from the center of aircraft control system 400), a mechanism is needed to align the rotational axis of throttle levers 404-1 and 404-2. Thus, in some embodiments, control arms 406-1 and 406-2 extend the output arms upwards and throttle levers 404-1 and 404-2 extend from the control arms 406-1 and 406-2 in an angle towards the center axis of aircraft control system 400. In some examples, after reaching the center axis of aircraft control system 400, throttle levers 404-1 and 404-2 extend upwards and in parallel to each other. Thus, throttle levers 404-1 and 404-2 are adjacent to each other and can be actuated with one or both hands.

Figure 5:
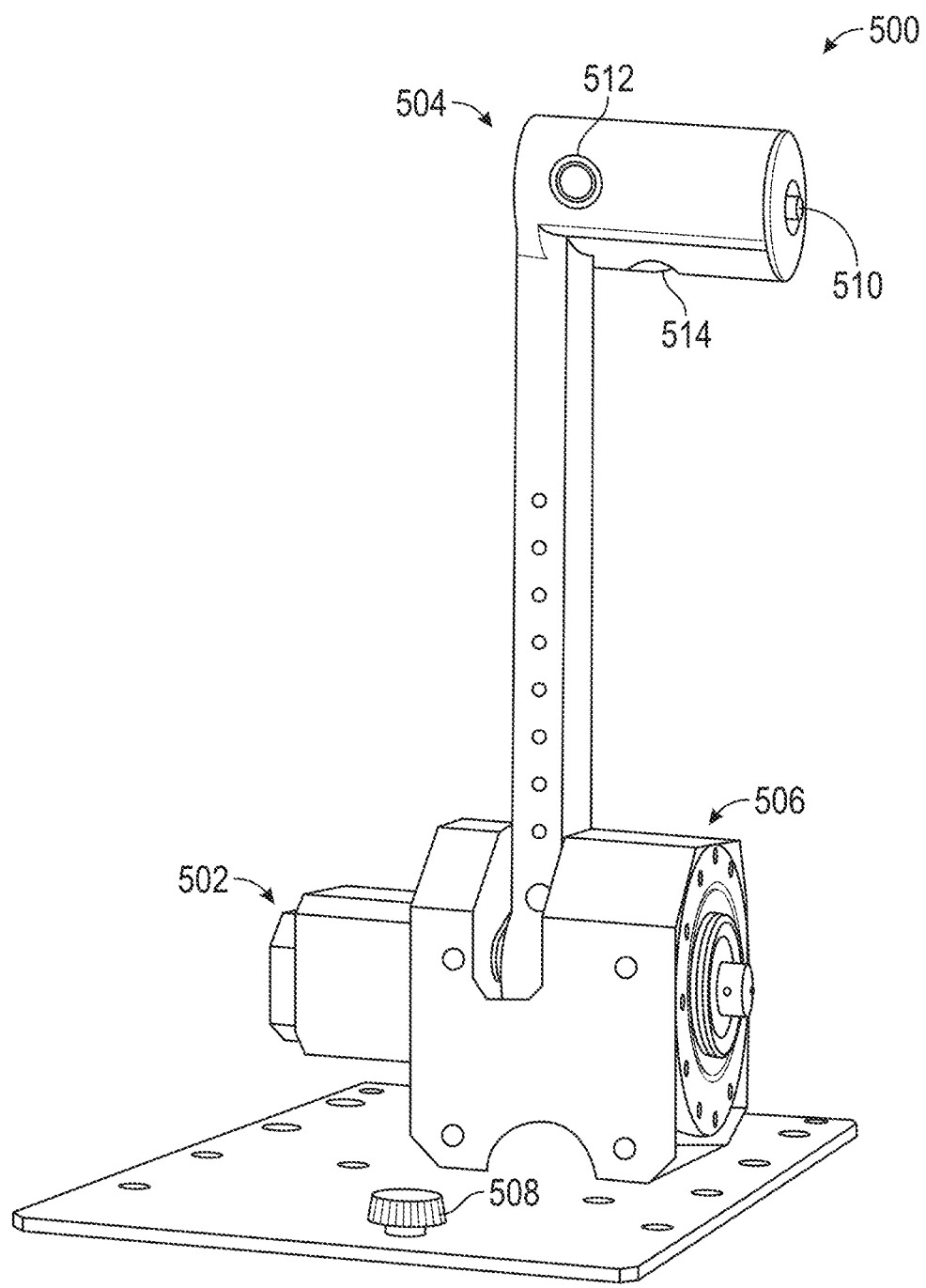
FIG. 5 illustrates an exemplary aircraft control system implementing an exemplary aircraft control module in accordance with examples of the disclosure.

FIG. 5 illustrates an exemplary aircraft control system 500 implementing an exemplary aircraft control module 502 in accordance with examples of the disclosure. In some embodiments, aircraft control module 502 can be similar to aircraft control module 100 and/or aircraft control module 200. In some embodiments, aircraft control system 500 comprises a throttle lever 504 and an aircraft control module 502. For example, an aircraft implementing aircraft control system 500 may be a single-engine aircraft such that only a single throttle control is required (e.g., to control the throttle of the single engine). In some embodiments, aircraft control module 502 is housed in an aircraft control housing 506. In some embodiments, aircraft control system 500 includes further structures to ensure aircraft control module 502 is secured within aircraft control housing 506.

As illustrated, throttle lever 504 is coupled directly to the inner shear hub of aircraft control module 502 such that the rotational axis of throttle lever 504 is the rotational axis of the motor in aircraft control module 502. In some embodiments, when throttle lever 504 is coupled directly to the inner shear hub of aircraft control module 502, the global positioning gear is omitted from the assembly (e.g., because, in some embodiments, one full rotation of the motor translates 1-to-1 to one full rotation of throttle lever 504). Thus, in some embodiments, aircraft control module 502 provides only the base resistance (e.g., because global position is unavailable). In some embodiments, other systems are used to provide the global positioning and/or to implement the hard walls and/or detents. In some embodiments, throttle lever 504 can alternatively be coupled to an output arm of aircraft control module 502 such that the output arm extends out of housing 506.

In some embodiments, aircraft control system 500 includes a resistance adjustment knob 508 (e.g., dial). In some embodiments, resistance adjustment knob 308 adjusts the resistance (e.g., torque) experienced by the throttle lever 504 and that is provided by the motor of aircraft control module 502. For example, twisting resistance adjustment knob 508 counter-clockwise can reduce the base resistance level of aircraft control module 502 and twisting resistance adjustment knob 308 clock-wise can increase the base resistance level of aircraft control module 502 (or vice versa). In some embodiments, other switches or knobs can be included to control different aspects of aircraft control module 502.

In some embodiments, throttle lever 504 can include one or more actuators. For example, in some embodiments, throttle lever 504 includes actuator 510, 512, and 514. In some embodiments, the actuators can perform any number of functions related to control of the respective aircraft control module. In some embodiments, actuator 510 is a take-off-go-around ("TOGA") button that puts the aircraft control module 502 at the take-off power setting for take-off. In some embodiments, after actuating actuator 510, aircraft control module 502 can automatically move the lever to the maximum position to set the throttle to the highest setting for take-off. In some embodiments, actuator 512 is an automatic-throttle switch that enables or disables the automatic throttle setting of aircraft control module 502 (e.g., to enter or exit autonomous flying modes). In some embodiments, actuator 514 is a throttle release actuator that releases a simulated hard wall or "gate" that prevents the throttle lever from being fully pulled down (i.e., to bring the throttle to idle or a thrust reversal setting).

Figure 6A:
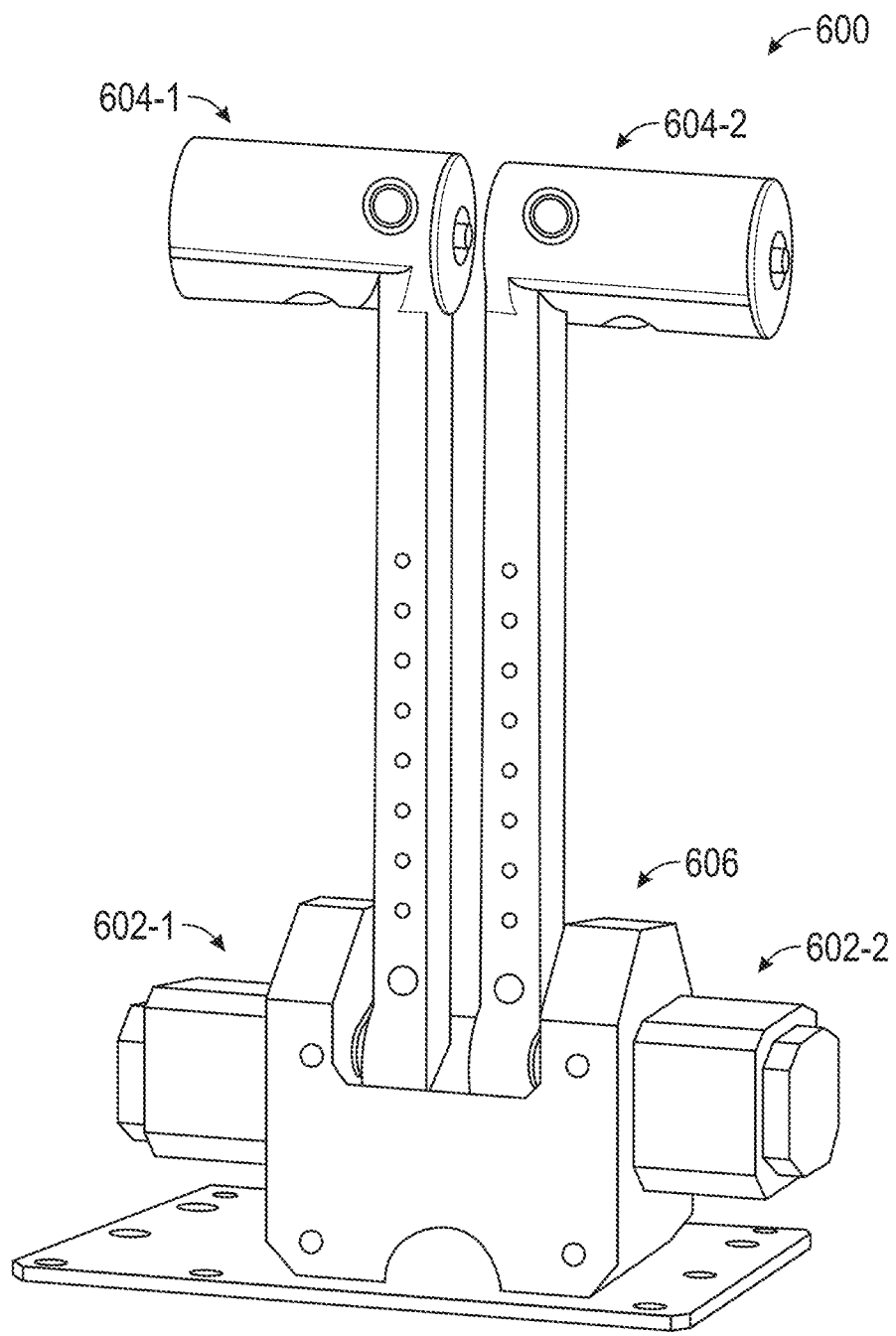
FIGS. 6A-6B illustrate exemplary aircraft control systems implementing exemplary aircraft control modules in accordance with examples of the disclosure.
Figure 6B:
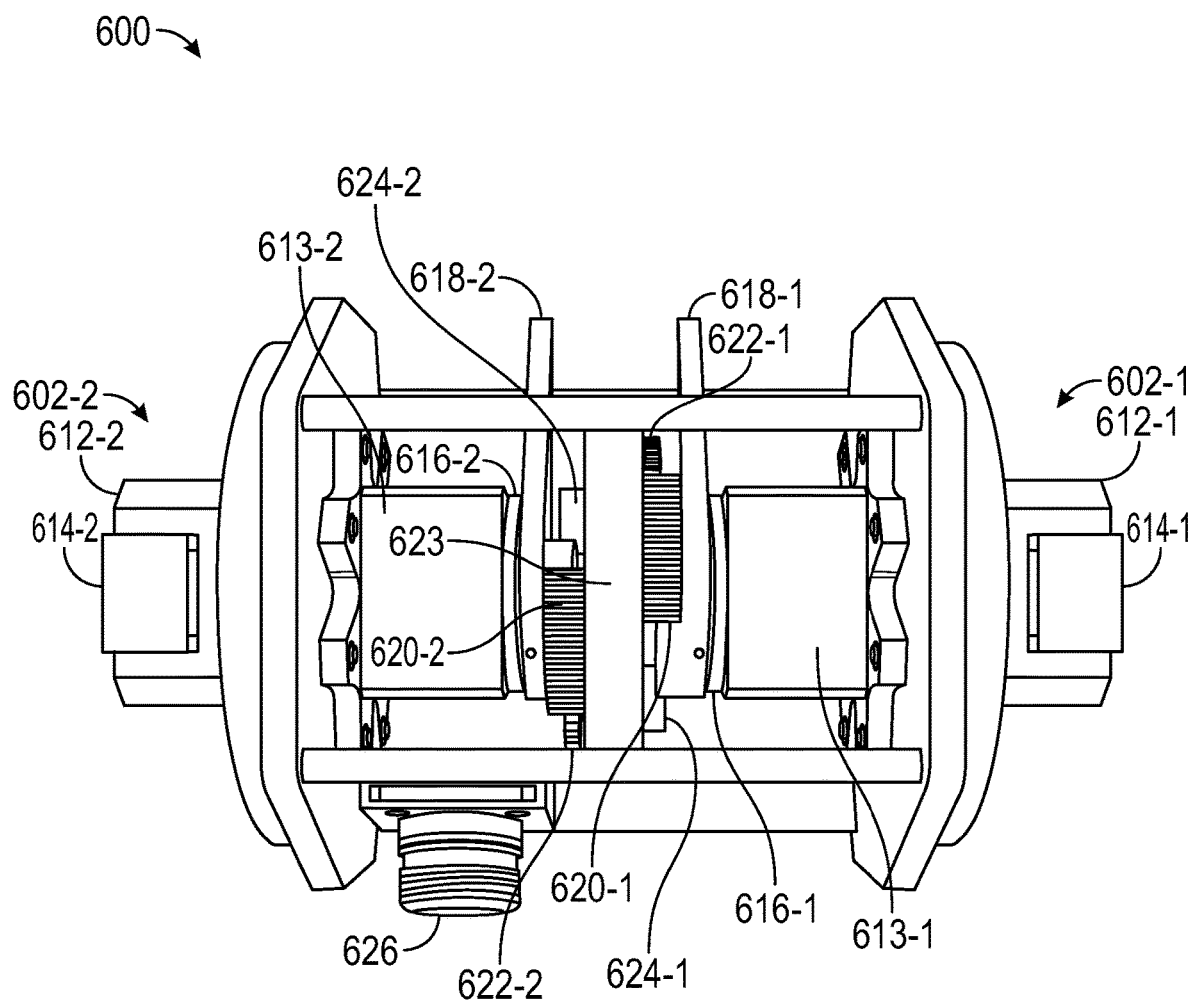

FIG. 6A illustrates an exemplary aircraft control system 600 implementing exemplary aircraft control modules 602-1 and 602-2 in accordance with examples of the disclosure. In some embodiments, aircraft control module 602-1 and 602-2 can be similar to aircraft control module 100 and/or aircraft control module 200. In some embodiments, aircraft control system 600 comprises throttle levers 604-1 and 604-2 and aircraft control modules 602-1 and 602-2. For example, an aircraft implementing aircraft control system 600 may be a dual-engine aircraft such that two throttle controls are required (e.g., to control the throttle of the two engine). In such examples, aircraft control module 602-1 is coupled to throttle lever 604-1 to control the throttle of one of the two engines and aircraft control module 602-2 is coupled to throttle lever 604-2 to control the throttle of the other of the two engines. In some embodiments, aircraft control modules 602-1 and 602-2 are housed in an aircraft control housing 606. In some embodiments, aircraft control modules 602-1 and 602-2 are positioned co-axially and in an opposing fashion. In other words, aircraft control modules 602-1 and 602-2 and their respective throttles are aligned in a line and the aircraft control modules face each other (e.g., inward) such that the respective throttles are adjacent.

As illustrated, throttle levers 604-1 and 604-2 are coupled to the inner shear hub of aircraft control modules 602-1 and 602-2 such that the rotational axis of throttle levers 604-1 and 604-2 are the rotational axis of the motor in aircraft control modules 602-1 and 604-2. In some embodiments, throttle levers 604-1 and 604-2 can be coupled to output arms of the aircraft control modules such that the output arm extends out of housing 606.

FIG. 6B illustrates an overhead view of exemplary aircraft control system 600 implementing exemplary aircraft control modules 602-1 and 602-2 in accordance with examples of the disclosure. As shown in FIG. 6B, the top cover of aircraft control housing 606 is omitted to reveal the internal mechanics of aircraft control system 600.

In some embodiments, aircraft control system 600 includes two aircraft control modules 602-1 and 602-2. In some embodiments, aircraft control module 602-1 and 602-2 can be similar to aircraft control module 100 and/or aircraft control module 200. As illustrated, in some embodiments, aircraft control module 602-1 includes motor 612-1, gearhead 613-1, inner shear hub 616-1, output arm 618-1, gear cap 620-1, global positioning gear 622-1, and encoder 614-1. In some embodiments, aircraft control module 602-2 includes motor 612-2, gearhead 613-2, inner shear hub 616-2, output arm 618-2, gear cap 620-2, global positioning gear 622-2, and encoder 614-2.

In some embodiments, as shown, aircraft control module 602-1 and 602-2 can include gearheads 613-1 and 613-2, respectively. In some embodiments, as described above, gearhead 613-1 and gearhead 613-2 house one or more gears that can transform the torque and/or rotational speed characteristics of motor 612-1 and 612-2. For example, gearhead 613-1 and gearhead 613-2 can halve the rotational speed of motor 612-1 and 612-2, respectively (and thus increase the output torque of the motor). Thus, in some embodiments, global positioning gear and global positioning encoders can be used to determine the global position of the throttle lever (e.g., because, in some embodiments, as a result of gearhead 613-1 and 613-2, one full rotation of the respective motors do not translate 1-to-1 with the one full rotation of the throttle levers). In some embodiments, as shown, encoder 614-1 and 614-2 is coupled to the top sides of motor 612-1 and motor 612-2, respectively. In some embodiments, as shown, output arm 618-1 and output arm 618-2 extend in the same direction despite motor 612-1 and motor 612-2 facing towards each other in opposing directions. In some embodiments, output arm 618-1 and output arm 618-2 can extend in opposite directions without affecting the operation of aircraft control system 600 (e.g., because motor 612-1 and motor 612-2 are controlled electronically, the controls can be inverted easily). In some embodiments, a center support bracket 623 is positioned in the center of aircraft control system 600 to provide structural support for aircraft control module 602-1 and aircraft control module 602-2.

As shown, in some embodiments, gear cap 620-2 is coupled to the "back" of output arm 618-2 (e.g., on the side opposite as where the output arm extends outwards). In some embodiments, gear cap 620-1 is coupled to the "front" of output arm 618-1 (e.g., on the same side as where the output arm extends outwards). Thus, global positioning gear 622-1 is on a different side of aircraft control system 600 as global positioning gear 622-2 and thus their operation does not interfere with each other. In some embodiments, each of global positioning gear 622-1 and global positioning gear 622-2 is coupled to its own dedicated global positioning encoder. For example, global positioning gear 622-1 is coupled to global positioning encoder 624-1 and global positioning gear 622-2 is coupled to global positioning encoder 624-1. In some embodiments, the global positioning encoder 624-1 and global positioning encoder 624-2 are mounted to center support bracket 623.

In some embodiments, aircraft control system 600 includes an output port 626 to which a connector can be connected to receive and/or transmit electrical signals to and from the elements in aircraft control system 600. In some embodiments, output port 626 is a transmitter capable of transmitting the lever position(s) to one or more controllers. As described above, output port 626 can be a mechanical linkage (e.g., as opposed to an electronic port) that connects directly to an aircraft performance device or to the aircraft performance device via one or more other mechanical and/or electrical systems. In some embodiments, output port 626 includes a plurality of pins to which the connector can connect. In some embodiments, each pin controls a different controllable element in aircraft control system 600. For example, output port can have four pins to drive motor 612-1 and motor 612-2 and receive outputs from global positioning encoder 624-1 and global positioning encoder 624-2. In some embodiments, multiple pins can be used for each or any controllable element based on the requirements of the particular controllable element (e.g., a motor can have a positive and negative contact, or an extra contact can be used to supply a system ground, etc.). Any other number of pins and/or signals can be transmitted through output port 626.

Although the above disclosure describes coupling the aircraft control modules with a throttle lever, it is understood that the aircraft control modules described herein can be used with any actuator. For example, the aircraft control modules can be used with a control yoke, rudder pedals, or any other pilot input mechanism. It is understood that the aircraft control modules disclosed herein are not limited to only aircraft mechanisms. For example, the aircraft control modules can be used in flight simulators, automobiles, other types of vehicles, or in any system with a human controlled input device.

In some embodiments, an electronic control unit can control the aircraft control modules described herein. In some embodiments, the electronic control unit can cause the aircraft control modules to perform the functions described herein and/or provide the amount of torque or resistance as disclosed. In some embodiments, the electronic control unit can include memory (which optionally includes one or more computer readable storage medium), a memory controller, one or more processing units (CPUs), peripherals interface, input/output subsystems, other input or control devices and an external port. In some embodiments, these components can optionally communicate over one or more communication buses or signal lines, with the aircraft control modules and/or other aircraft control units, sensors, or instruments. In some embodiments, the one or more computer readable storage medium can store one or more programs, which when executed by the one or more processors (e.g., processing units), can cause the electronic control unit to perform any of the methods described herein.

Therefore, according to the above, some examples of the disclosure are directed to an aircraft control system. In some embodiments, the aircraft control system comprises a motor comprising a rotating shaft; a lever comprising an axis of rotation, the lever connected to the rotating shaft, wherein a position of the lever is not maintained by a mechanical clutch during normal operation; a fail-safe system for maintaining mechanical friction of the lever in an event of a failure; a sensor identifying a position of the lever; and a transmitter transmitting the lever position to a controller, the controller adjusting an aircraft performance device based on the received lever position.

Additionally or alternatively, in some embodiments, the fail-safe system comprises a mechanical torque limiter. Additionally or alternatively, in some embodiments, the fail-safe system comprises a current sensor and the event of a failure comprises detecting a current reading above an upper threshold or does not exceed a lower threshold. Additionally or alternatively, in some embodiments, the fail-safe system comprises shear pins and the event of a failure comprises a manual torque on the lever sufficient to break the shear pins. Additionally or alternatively, in some embodiments, the lever comprises an end with a handle. Additionally or alternatively, in some embodiments, the lever comprises an end connected to the rotating shaft. Additionally or alternatively, in some embodiments, the end connected to the rotating shaft comprises the axis of rotation. Additionally or alternatively, in some embodiments, the motor provides torque on the lever, wherein providing torque on the lever includes resisting the manual operation of the lever and assisting the manual operation of the lever. Additionally or alternatively, in some embodiments, the motor provides the torque during a non-automatic control mode of the aircraft. Additionally or alternatively, in some embodiments, the torque is manually adjustable. Additionally or alternatively, in some embodiments, the aircraft control system further comprises a dial on the control, wherein movement of the dial adjusts the torque provided by the motor.

Additionally or alternatively, in some embodiments, the aircraft control system further comprises a controller configured to adjust the torque applied to the shaft to simulate physical features to mimic a conventional throttle lever. Additionally or alternatively, in some embodiments, the aircraft control system further comprises a processor configured to determine a difference between the sensed position of the lever and a predicted position of the lever. Additionally or alternatively, in some embodiments, the processor disengages an automatic control mode when the difference between the sensed position of the lever and the predicted position of the lever exceeds a threshold. Additionally or alternatively, in some embodiments, the threshold is a temporal threshold. Additionally or alternatively, in some embodiments, the threshold is a spatial threshold. Additionally or alternatively, in some embodiments, when the difference between the sensed position of the lever and the predicted position of the lever exceeds a threshold indicative of a manual override of the aircraft control system, the processor updates a parameter. Additionally or alternatively, in some embodiments, the motor is configured to produce an oscillation as the aircraft approaches a performance limit.

Some embodiments of the disclosure are directed to an aircraft control method. In some embodiments, the aircraft control method comprises connecting a lever to a motor shaft; rotating the motor shaft; maintaining a position of the lever during normal operation without a mechanical clutch; maintaining mechanical friction of the lever in an event of a failure; identifying a position of the lever; transmitting the lever position to a controller; and adjusting, by the controller, an aircraft performance device based on the received lever position.

Additionally or alternatively, in some embodiments, maintaining the lever with mechanical friction during a failure comprises providing a mechanical torque limiter. Additionally or alternatively, in some embodiments, the aircraft control method further comprises detecting a current reading; and determining a failure when the current reading exceeds an upper threshold or does not exceed a lower threshold. Additionally or alternatively, in some embodiments, the mechanical torque limiter comprises shearing pins configured to break when a sufficient manual torque is applied to the lever. Additionally or alternatively, in some embodiments, the lever comprises an end with a handle. Additionally or alternatively, in some embodiments, the lever comprises an end connected to the rotating shaft. Additionally or alternatively, in some embodiments, the end connected to the rotating shaft comprises the axis of rotation. Additionally or alternatively, in some embodiments, the aircraft control method further comprises providing, by the motor, a torque on the lever, wherein providing torque on the lever includes resisting the manual operation of the leer and assisting the manual operation of the lever. Additionally or alternatively, in some embodiments, providing, by the motor, a torque opposing manual operation of the lever further comprises providing the torque during a non-automatic control mode of the aircraft. Additionally or alternatively, the aircraft control method further comprises detecting a manual adjustment of the torque. Additionally or alternatively, in some embodiments, a motor control is connected to a dial and wherein detecting manual adjustment comprises detecting movement of the dial. Additionally or alternatively, in some embodiments, the aircraft control method further comprises adjusting the torque to simulate physical features to mimic a conventional throttle lever.

Additionally or alternatively, in some embodiments, the aircraft control method further comprises determining a difference between the sensed position of the lever and a predicted position of the lever. Additionally or alternatively, in some embodiments, the aircraft control method further comprises disengaging an automatic control mode when the difference between the sensed position of the lever and the predicted position of the lever exceeds a threshold. Additionally or alternatively, in some embodiments, the threshold is a temporal threshold. Additionally or alternatively, in some embodiments, the threshold is a spatial threshold. Additionally or alternatively, in some embodiments, the aircraft control method further comprises when the difference between the sensed position of the lever and the predicted position of the lever exceeds a threshold indicative of a manual override of the aircraft control system, updating a parameter. Additionally or alternatively, in some embodiments, the aircraft control method further comprises disengaging an automatic control mode when the difference between the sensed velocity of the lever and the predicted velocity of the lever exceeds a threshold. Additionally or alternatively, in some embodiments, the aircraft control method disengaging an automatic control mode when the difference between the sensed jerk of the lever and the predicted jerk of the lever exceeds a threshold. Additionally or alternatively, in some embodiments, the aircraft control method further comprises producing a motor oscillation as the aircraft approaches a performance limit.

In the above description of examples, reference is made to the accompanying drawings which form a part hereof, and in which it is shown by way of illustration specific examples that is practiced. It is understood that similar elements are referenced with similar numerals throughout. It is understood that the figures are not necessarily drawn to scale. Nor do they necessarily show all the details of the various exemplary embodiments illustrated. Rather, they merely show certain features and elements to provide an enabling description of the exemplary embodiments. Any variations in font in the diagrams or figures are not intended to signify a distinction or emphasis, except those explicitly described.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims. The various embodiments of the invention should be understood that they have been presented by way of example only, and not by way of limitation. Likewise, the various diagrams may depict an example architectural or other configuration for the invention, which is done to aid in understanding the features and functionality that is included in the invention. The invention is not restricted to the illustrated example architectures or configurations, but is implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments.

The particular features presented in the dependent claims is combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known," and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to," or other like phrases in some instances shall not be read to mean that the narrower case is intended or required in instances where such broadening phrases may be absent.

We claim:

1. An aircraft control system comprising:
   a motor comprising a rotating shaft;
   a lever comprising an axis of rotation, the lever connected to the rotating shaft, wherein a position of the lever is not maintained by a mechanical clutch during normal operation;
   a fail-safe system for maintaining mechanical friction of the lever in an event of a failure;
   a sensor identifying a position parameter of the lever;
   a transmitter transmitting the lever position parameter to a controller, the controller adjusting an aircraft performance device based on the received lever position parameter; and
   a processor configured to determine a difference between the sensed position parameter of the lever and a predicted position parameter of the lever and, in response to detecting that the difference exceeds a temporal threshold, adjust an aircraft control, wherein the processor disengages an automatic control mode when the difference between the sensed position parameter of the lever and the predicted position parameter of the lever exceeds the temporal threshold.

2. The aircraft control system of claim 1, wherein the fail-safe system comprises a mechanical torque limiter.

3. The aircraft control system of claim 2, wherein the fail-safe system comprises a current sensor and the event of a failure comprises detecting a current reading above an upper threshold or does not exceed a lower threshold.

4. The aircraft control system of claim 2, wherein the fail-safe system comprises shear pins and the event of a failure comprises a manual torque on the lever sufficient to break the shear pins.

5. The aircraft control system of claim 1, wherein the lever comprises an end with a handle.

6. The aircraft control system of claim 1, wherein the lever comprises an end connected to the rotating shaft.

7. The aircraft control system of claim 6, wherein the end connected to the rotating shaft comprises the axis of rotation.

8. The aircraft control system of claim 1, wherein the motor provides torque on the lever, wherein providing torque on the lever includes resisting the manual operation of the lever and assisting the manual operation of the lever.

9. The aircraft control system of claim 8, wherein the motor provides the torque during a non-automatic control mode of the aircraft.

10. The aircraft control system of claim 8, wherein the torque is manually adjustable.

11. The aircraft control system of claim 10, further comprising a dial, wherein movement of the dial adjusts the torque provided by the motor.

12. The aircraft control system of claim 8, wherein the controller is configured to adjust the torque applied to the shaft to simulate physical features to mimic a conventional throttle lever.

13. The aircraft control system of claim 1, wherein when the difference between the sensed position parameter of the lever and the predicted position parameter of the lever exceeds a threshold indicative of a manual override of the aircraft control system, the processor updates at least one of the predicted position parameter and a target throttle position.

14. The aircraft control system of claim 1, wherein the motor is configured to produce an oscillation as the aircraft approaches a performance limit.

15. The aircraft control system of claim 1, wherein:
   the motor is a brushless DC motor; and
   the position parameter comprises at least one of a position of the lever, a velocity of the lever, an acceleration of the lever, and a jerk of the lever.

16. The aircraft control system of claim 15, wherein the processor determines a difference between the sensed position parameter of the lever and the predicted position parameter of the lever and disengages an automatic control mode when the difference between the sensed position parameter of the lever and the predicted position parameter of the lever exceeds the threshold.

17. The aircraft control system of claim 16, wherein the fail-safe system comprises a mechanical torque limiter.

18. The aircraft control system of claim 17, wherein the fail-safe system comprises a current sensor and the event of a failure comprises detecting a current reading above an upper threshold or does not exceed a lower threshold.

19. The aircraft control system of claim 16, wherein the threshold is a temporal threshold.

20. The aircraft control system of claim 16, wherein the threshold is a spatial threshold.

21. The aircraft control system of claim 16, wherein when the difference between the sensed position parameter of the lever and the predicted position parameter of the lever exceeds a threshold indicative of a manual override of the aircraft control system, the processor updates at least one of the predicted position and a target throttle position.

22. An aircraft control method comprising:
   connecting a lever to a motor shaft;
   rotating the motor shaft;
   maintaining a position of the lever during normal operation without a mechanical clutch;
   maintaining mechanical friction of the lever in an event of a failure;
   identifying a position parameter of the lever;
   transmitting the lever position parameter to a controller;
   determining a difference between the sensed position parameter of the lever and a predicted position parameter of the lever;
   adjusting, by the controller, an aircraft performance device based on the received lever position parameter;
   in response to determining the difference exceeds a temporal threshold, adjusting an aircraft control; and
   disengaging an automatic control mode when the difference between the sensed position parameter of the lever and the predicted position parameter of the lever exceeds the temporal threshold.

23. The aircraft control method of claim 22, wherein maintaining the lever with mechanical friction during a failure comprises providing a mechanical torque limiter.

24. The aircraft control method of claim 23, further comprising:
   detecting a current reading; and
   determining a failure when the current reading exceeds an upper threshold or does not exceed a lower threshold.

25. The aircraft control method of claim 23, wherein the mechanical torque limiter comprises shearing pins configured to break when a sufficient manual torque is applied to the lever.

26. The aircraft control method of claim 22, wherein the lever comprises an end with a handle.

27. The aircraft control method of claim 22, wherein the lever comprises an end connected to the rotating shaft.

28. The aircraft control method claim 27, wherein the end connected to the rotating shaft comprises the axis of rotation.

29. The aircraft control method of claim 22, further comprising providing, by the motor, a torque on the lever, wherein providing torque on the lever includes resisting the manual operation of the lever and assisting the manual operation of the lever.

30. The aircraft control method of claim 29, wherein providing, by the motor, a torque opposing manual operation of the lever further comprises providing the torque during a non-automatic control mode of the aircraft.

31. The aircraft control method of claim 29, further comprising detecting a manual adjustment of the torque.

32. The aircraft control method of claim 31, wherein a motor control is connected to a dial and wherein detecting manual adjustment comprises detecting movement of the dial.

33. The aircraft control method of claim 29, further comprising adjusting the torque to simulate physical features to mimic a conventional throttle lever.

34. The aircraft control method of claim 22, further comprising when the difference between the sensed position parameter of the lever and the predicted position parameter of the lever exceeds a threshold indicative of a manual override of the aircraft control system, updating at least one of the predicted position parameter and a target throttle position.

35. The aircraft control method of claim 22, further comprising disengaging an automatic control mode when the difference between the sensed position parameter of the lever and the predicted position parameter of the lever exceeds the threshold, wherein the sensed position parameter is a sensed velocity and the predicted position parameter is a predicted velocity.

36. The aircraft control method of claim 22, further comprising disengaging an automatic control mode when the difference between the sensed position parameter of the lever and the predicted position parameter of the lever exceeds the threshold, wherein the sensed position parameter is a sensed acceleration and the predicted position parameter is a predicted acceleration.

37. The aircraft control method of claim 22, further comprising disengaging an automatic control mode when the difference between the sensed position parameter of the lever and the predicted position parameter of the lever exceeds the threshold, wherein the sensed position parameter is a sensed jerk and the predicted position parameter is a predicted jerk.

38. The aircraft control method of claim 22, further comprising producing a motor oscillation as the aircraft approaches a performance limit.

* * * * *